(12) United States Patent
Lau et al.

(10) Patent No.: US 11,515,927 B2
(45) Date of Patent: Nov. 29, 2022

(54) BEAM MANAGEMENT WITH BACKTRACKING AND DITHERING

(71) Applicant: QUALCOMM Incorporated, San Diego, CA (US)

(72) Inventors: Siu On Lau, San Diego, CA (US); Mihir Vijay Laghate, San Diego, CA (US)

(73) Assignee: QUALCOMM INCORPORATED, San Diego, CA (US)

( * ) Notice: Subject to any disclaimer, the term of this patent is extended or adjusted under 35 U.S.C. 154(b) by 0 days.

(21) Appl. No.: 17/084,985

(22) Filed: Oct. 30, 2020

(65) Prior Publication Data
US 2022/0140886 A1    May 5, 2022

(51) Int. Cl.
*H04B 7/08* (2006.01)

(52) U.S. Cl.
CPC ................................. *H04B 7/088* (2013.01)

(58) Field of Classification Search
CPC .... H04B 7/088; H04B 7/0408; H04B 7/0602; H04B 7/043; H04B 7/0639
See application file for complete search history.

(56) References Cited

U.S. PATENT DOCUMENTS

| | | | | |
|---|---|---|---|---|
| 6,233,451 B1 * | 5/2001 | Noerpel | ................... | H04B 7/19 455/427 |
| 8,411,656 B2 * | 4/2013 | Liu | ...................... | H04B 1/7103 370/338 |
| 8,558,552 B2 * | 10/2013 | Chappell | ................ | G01R 31/11 324/534 |
| 8,942,207 B2 * | 1/2015 | Son | ................... | H04W 36/0069 370/331 |
| 9,560,561 B2 * | 1/2017 | Son | ................... | H04W 36/0069 |

(Continued)

FOREIGN PATENT DOCUMENTS

| | | | | |
|---|---|---|---|---|
| CN | 106284643 A | * | 1/2017 | ............... E04B 1/00 |
| CN | 106284643 B | * | 6/2018 | ............... E04B 1/00 |

(Continued)

OTHER PUBLICATIONS

WO2020026454 (Japanese Language) User terminal and wireless communication systems & method, issued to Hou et al.*

(Continued)

*Primary Examiner* — Berhanu Tadese
(74) *Attorney, Agent, or Firm* — Holland & Hart LLP

(57) ABSTRACT

Methods, systems, and devices for wireless communications are described. A first wireless device may determine a best beam for communications with a second wireless device using a beam selection procedure and beam selection algorithm based on measurements of one or more beam selection parameters for different layers of beams. For example, the first wireless device may measure a beam selection parameter to select a first layer beam and then may measure the beam selection parameter for one or more second layer beams corresponding to the first layer beam. Based on the beam selection parameter measurements, the first wireless device may determine to backtrack and select a different first layer beam to continue the beam selection procedure. Additionally, the first wireless device may apply dithering to the initially selected first layer beam to decrease chances the initially selected first layer beam is selected again.

41 Claims, 16 Drawing Sheets

(56) References Cited

U.S. PATENT DOCUMENTS

| | | | | |
|---|---|---|---|---|
| 9,955,408 | B2* | 4/2018 | Novlan | H04W 48/16 |
| 10,158,173 | B2* | 12/2018 | Foo | H04B 7/0697 |
| 10,389,426 | B2* | 8/2019 | Rahman | H04B 7/0417 |
| 10,411,773 | B2* | 9/2019 | Faxér | H04B 7/0469 |
| 10,517,061 | B1* | 12/2019 | Kumar | H04W 24/08 |
| 10,608,715 | B2* | 3/2020 | Faxér | H04B 7/0478 |
| 10,666,342 | B1* | 5/2020 | Landis | H04B 7/0632 |
| 10,735,870 | B2* | 8/2020 | Ballande | H04R 25/405 |
| 10,798,588 | B2* | 10/2020 | Yu | H04W 72/04 |
| 10,925,062 | B2* | 2/2021 | Liu | H04W 72/048 |
| 10,972,162 | B2* | 4/2021 | Faxér | H04B 7/0639 |
| 11,063,652 | B2* | 7/2021 | Xiong | H04W 72/082 |
| 2007/0213038 | A1* | 9/2007 | Masseroni | H04L 47/18 |
| | | | | 455/414.3 |
| 2014/0112194 | A1* | 4/2014 | Novlan | H04W 8/005 |
| | | | | 370/254 |
| 2016/0057770 | A1* | 2/2016 | Yerramalli | H04L 5/0007 |
| | | | | 370/329 |
| 2017/0163296 | A1* | 6/2017 | Terry | H04B 1/69 |
| 2018/0103407 | A1* | 4/2018 | Nagaraja | H04W 72/044 |
| 2018/0124766 | A1* | 5/2018 | Nagaraja | H04W 16/28 |
| 2018/0176949 | A1* | 6/2018 | Islam | H04W 74/0833 |
| 2018/0176958 | A1* | 6/2018 | Islam | H04W 72/046 |
| 2018/0227772 | A1* | 8/2018 | Yu | H04B 7/0619 |
| 2018/0351611 | A1* | 12/2018 | Nagaraja | H04B 7/0417 |
| 2018/0368142 | A1* | 12/2018 | Liou | H04W 74/0808 |
| 2019/0044578 | A1* | 2/2019 | Rao | H04B 7/043 |
| 2019/0082334 | A1* | 3/2019 | Nagaraja | H04W 36/0055 |
| 2019/0174311 | A1* | 6/2019 | Hayashi | H04L 9/0866 |
| 2019/0200365 | A1* | 6/2019 | Sampath | H04B 1/3838 |
| 2019/0239135 | A1 | 8/2019 | Levitsky et al. | |
| 2019/0253117 | A1* | 8/2019 | Raghavan | H04B 7/0623 |
| 2019/0268053 | A1 | 8/2019 | Wilson et al. | |
| 2019/0268060 | A1* | 8/2019 | Nam | H04B 7/0695 |
| 2019/0305830 | A1* | 10/2019 | Zhou | H04L 1/1664 |
| 2019/0380053 | A1 | 12/2019 | Bai et al. | |
| 2020/0007216 | A1* | 1/2020 | Nasiri Khormuji | H04B 7/063 |
| 2020/0007219 | A1 | 1/2020 | Fellhauer et al. | |
| 2020/0044716 | A1* | 2/2020 | Yilmaz | H04B 7/0658 |
| 2020/0084735 | A1* | 3/2020 | Cheng | H04W 52/34 |
| 2020/0112926 | A1* | 4/2020 | Laghate | H04B 7/0404 |
| 2020/0186229 | A1 | 6/2020 | Raghavan et al. | |
| 2020/0196383 | A1* | 6/2020 | Tsai | H04L 5/0092 |
| 2020/0220597 | A1* | 7/2020 | Rahman | H04B 7/0417 |
| 2020/0252783 | A1* | 8/2020 | Novlan | H04W 76/14 |
| 2020/0288479 | A1* | 9/2020 | Xi | H04B 7/02 |
| 2020/0389852 | A1* | 12/2020 | Wang | H04B 7/0695 |
| 2020/0396731 | A1* | 12/2020 | Venugopal | H04B 7/0695 |
| 2021/0006986 | A1 | 1/2021 | Zhu et al. | |
| 2021/0028847 | A1* | 1/2021 | Bedekar | H04B 7/0695 |
| 2021/0068123 | A1* | 3/2021 | Zhu | H04B 7/0874 |
| 2021/0099992 | A1* | 4/2021 | Mao | H04B 7/0417 |
| 2021/0109145 | A1* | 4/2021 | Haustein | G01R 29/10 |
| 2021/0136741 | A1* | 5/2021 | Onggosanusi | H04L 5/0051 |
| 2021/0168788 | A1* | 6/2021 | Liu | H04W 56/0015 |
| 2021/0175953 | A1* | 6/2021 | Nilsson | H04B 7/0632 |
| 2021/0194549 | A1* | 6/2021 | Faxér | H04B 7/0639 |
| 2021/0195651 | A1* | 6/2021 | Zhang | H04W 24/10 |
| 2021/0204251 | A1* | 7/2021 | Laghate | H04W 52/365 |
| 2021/0212051 | A1* | 7/2021 | Raghavan | H04W 8/005 |
| 2021/0235338 | A1* | 7/2021 | Zhang | H04W 24/08 |
| 2021/0242989 | A1* | 8/2021 | Levitsky | H04L 1/0003 |
| 2021/0258800 | A1* | 8/2021 | Yang | H04W 48/18 |
| 2022/0140886 | A1* | 5/2022 | Lau | H04B 7/0695 |
| | | | | 375/267 |

FOREIGN PATENT DOCUMENTS

| | | | | |
|---|---|---|---|---|
| JP | 6306692 B2 * | 4/2018 | | H04B 17/318 |
| WO | WO-2018029952 A1 * | 2/2018 | | H04L 9/08 |
| WO | WO-2019190538 A1 * | 10/2019 | | H04B 7/0452 |
| WO | WO-2019243449 A2 * | 12/2019 | | G01R 29/0871 |
| WO | WO-2020026454 A1 * | 2/2020 | | H04B 17/318 |
| WO | WO-2020118480 A1 * | 6/2020 | | |
| WO | WO-2020119597 A1 * | 6/2020 | | H04W 36/0058 |
| WO | WO-2020226471 A1 * | 11/2020 | | H04B 7/0482 |
| WO | WO-2021047760 A1 * | 3/2021 | | |
| WO | WO-2022093490 A1 * | 5/2022 | | H04B 7/088 |

OTHER PUBLICATIONS

WO2020026454, (WIPO Translated) User Terminal and Wireless Communications Systems & Method, issued to Hou et al.*
ETSI TR 138 912-V14.0.0-5G; Study on New Radio (NR) access technology (3GPP TR 38.912 version 14.0.0 Release 14), May 2017 (Year: 2017).*
Diethering—Wikipedia (Year: 2021).*
Partial International Search Report—PCT/US2021/053397—ISA/EPO—dated Feb. 4, 2022.
International Search Report and Written Opinion—PCT/US2021/053397—ISA/EPO—dated Mar. 25, 2022.
Partial International Search Report—PCT/US2022/019097—ISA/EPO—dated Jun. 14, 2022.

* cited by examiner

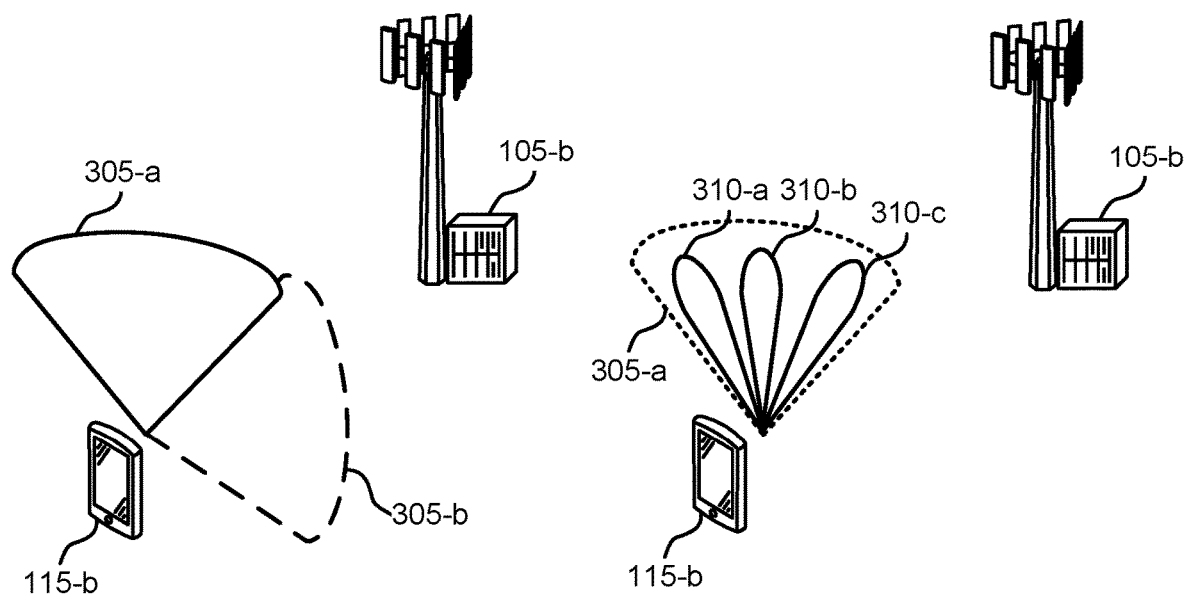
*Figure 3A*  — 300    *Figure 3B*  — 301
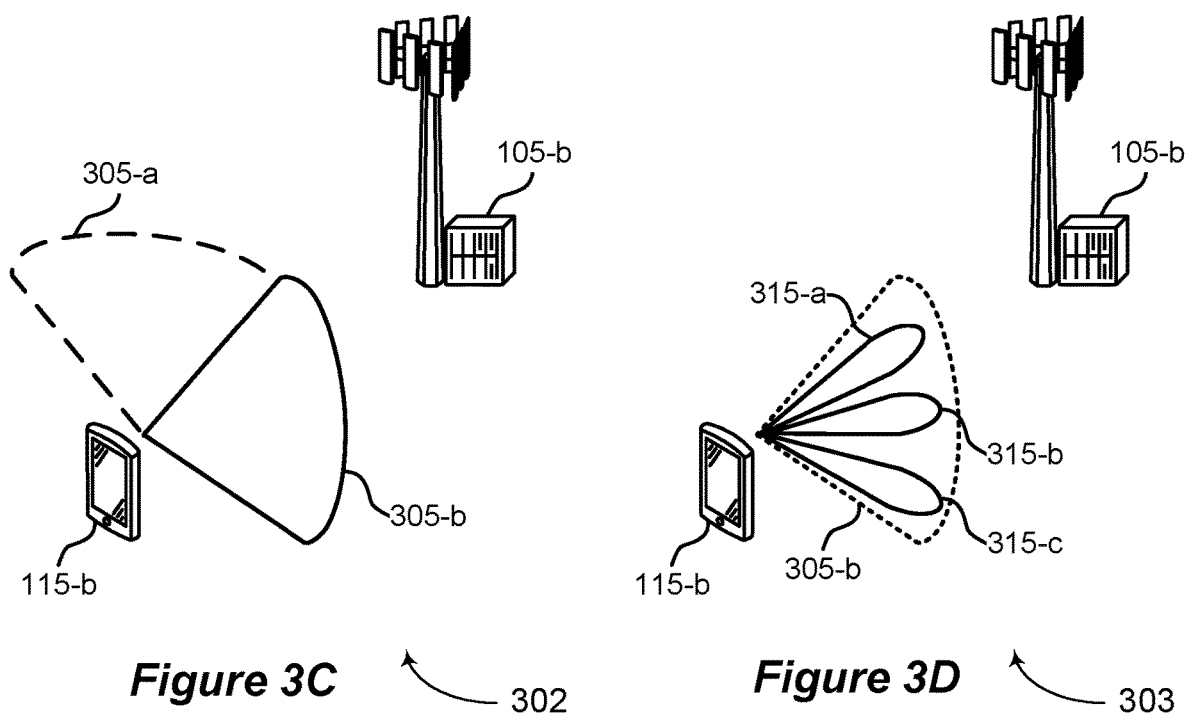
*Figure 3C*  — 302    *Figure 3D*  — 303

BEAM MANAGEMENT WITH BACKTRACKING AND DITHERING

TECHNICAL FIELD

The following relates to wireless communications, including beam management with backtracking and dithering.

DESCRIPTION OF THE RELATED TECHNOLOGY

Wireless communications systems are widely deployed to provide various types of communication content such as voice, video, packet data, messaging, broadcast, and so on. These systems may be capable of supporting communication with multiple users by sharing the available system resources (for example, time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM).

A wireless multiple-access communications system may include one or more base stations or one or more network access nodes, each simultaneously supporting communication for multiple communication devices, which may be otherwise known as user equipments (UEs). In some cases, a UE may use beamforming techniques to communicate with other wireless devices (for example, additional UEs, a base station, vehicles, satellites, or a different wireless device). Efficient techniques are desired for determining and selecting a beam at a UE for communications with one or more other wireless devices.

SUMMARY

The described techniques relate to improved methods, systems, devices, and apparatuses that support beam management with backtracking and dithering. Generally, the described techniques provide for a first wireless device, such as a user equipment (UE), to determine a best beam for communications with a second wireless device using a beam selection procedure and beam selection algorithm based on measurements of one or more beam selection parameters (that is, the best beam may correspond to a beam with a best beam selection parameter measured). For example, the first wireless device may determine a set of first layer beams (for example, beams for a given layer may include a number of activated elements for generating the beams that correspond to the given layer, which is described in greater detail in the following description), and the first wireless device may then use this set of first layer beams (for example, beams with a broadest coverage radiation pattern) to receive one or more transmissions from the second wireless device (for example, reference signals). Subsequently, the first wireless device may measure the beam selection parameters for each beam of the set of first layer beams based on at least some of the one or more received transmissions and may select a first beam of the set of first layer beams based on a measurement of the beam selection parameter for the first beam being a best value (for example, a highest value for the measurement of the beam selection parameter, such as a power measurement, or a lowest value for the measurement of the beam selection parameter, such as a desense energy measurement).

The first wireless device may then determine a set of second layer beams that are associated with the first beam (for example, the set of second layer beams may be referred to as child or children beams corresponding to the first beam) and may measure the beam selection parameter for at least some of, if not each of, the set of second layer beams. If each measurement of the beam selection parameter for respective beams of the set of second layer beams is worse than the measurement of the beam selection parameter for the first beam, the first wireless device may efficiently backtrack and select a different beam from the set of first layer beams to continue the beam selection procedure. Additionally, in some examples, the first wireless device may apply dithering (for example, intentionally applying an intended amount of noise) to the first beam after determining that the beam selection parameter for respective beams of the set of second layer beams is worse than the measurement of the beam selection parameter for the first beam, which will decrease a likelihood that the first wireless device will select the first beam of the set of first layer beams again.

One innovative aspect of the subject matter described in this disclosure can be implemented in a method for wireless communication at a first wireless device. The method may include receiving, from a second wireless device, one or more signals on each beam of a set of multiple first layer beams, measuring, as part of a beam selection procedure for communicating with the second wireless device, a first beam selection parameter for the one or more signals, the first beam selection parameter measured for each beam of the set of multiple first layer beams, selecting a first beam of the set of multiple the first layer beams based on the measuring, measuring a second beam selection parameter for each beam of a set of multiple second layer beams associated with the first beam based on selecting the first beam, and selecting a second beam of the set of multiple first layer beams based on measuring the first beam selection parameter and measuring the second beam selection parameter.

Another innovative aspect of the subject matter described in this disclosure can be implemented in an apparatus for wireless communications at a first wireless device. The apparatus may include a processor, memory in electronic communication with the processor, and instructions stored in the memory. The instructions may be executable by the processor to cause the apparatus to receive, from a second wireless device, one or more signals on each beam of a set of multiple first layer beams, measure, as part of a beam selection procedure for communicating with the second wireless device, a first beam selection parameter for the one or more signals, the first beam selection parameter measured for each beam of the set of multiple first layer beams, select a first beam of the set of multiple the first layer beams based on the measuring, measure a second beam selection parameter for each beam of a set of multiple second layer beams associated with the first beam based on selecting the first beam, and select a second beam of the set of multiple first layer beams based on measuring the first beam selection parameter and measuring the second beam selection parameter.

Another innovative aspect of the subject matter described in this disclosure can be implemented in another apparatus for wireless communications at a first wireless device. The apparatus may include means for receiving, from a second wireless device, one or more signals on each beam of a set of multiple first layer beams, means for measuring, as part of a beam selection procedure for communicating with the second wireless device, a first beam selection parameter for the one or more signals, the first beam selection parameter measured for each beam of the set of multiple first layer beams, means for selecting a first beam of the set of multiple the first layer beams based on the measuring, means for measuring a second beam selection parameter for each beam of a set of multiple second layer beams associated with the first beam based on selecting the first beam, and means for selecting a second beam of the set of multiple first layer beams based on measuring the first beam selection parameter and measuring the second beam selection parameter.

Another innovative aspect of the subject matter described in this disclosure can be implemented in a non-transitory computer-readable medium storing code for wireless communications at a first wireless device. The code may include instructions executable by a processor to receive, from a second wireless device, one or more signals on each beam of a set of multiple first layer beams, measure, as part of a beam selection procedure for communicating with the second wireless device, a first beam selection parameter for the one or more signals, the first beam selection parameter measured for each beam of the set of multiple first layer beams, select a first beam of the set of multiple the first layer beams based on the measuring, measure a second beam selection parameter for each beam of a set of multiple second layer beams associated with the first beam based on selecting the first beam, and select a second beam of the set of multiple first layer beams based on measuring the first beam selection parameter and measuring the second beam selection parameter.

In some examples of the method, apparatuses, and non-transitory computer-readable medium described herein, selecting the second beam of the set of multiple first layer beams may include operations, features, means, or instructions for selecting the second beam of the set of multiple the first layer beams based on a comparison of a set of multiple measurements of the second beam selection parameter for respective beams of the set of multiple second layer beams associated with the first beam to a first measurement of the first beam selection parameter for the first beam of the set of multiple the first layer beams.

In some examples of the method, apparatuses, and non-transitory computer-readable medium described herein, selecting the second beam of the set of multiple first layer beams may include operations, features, means, or instructions for selecting the second beam of the set of multiple the first layer beams from a range of beam identifiers selected for the beam selection procedure, the selecting of the second beam based on the second beam pointing in a different direction than the first beam.

Some examples of the method, apparatuses, and non-transitory computer-readable medium described herein may further include operations, features, means, or instructions for adjusting the first beam of the set of multiple the first layer beams by applying an arbitrary signal to add noise to signals received via the first beam based on measuring the first beam selection parameter and measuring the second beam selection parameter, where the second beam of the set of multiple the first layer beams may be selected based on adjusting the first beam.

Some examples of the method, apparatuses, and non-transitory computer-readable medium described herein may further include operations, features, means, or instructions for determining an operability condition for one or more technology operations of the first wireless device based on measurements of how the one or more technology operations may be affected by beamforming communications in a same time slot, where selecting the first beam of the set of multiple the first layer beams, the second beam of the set of multiple the first layer beams, or both may be based on determining the operability condition.

Some examples of the method, apparatuses, and non-transitory computer-readable medium described herein may further include operations, features, means, or instructions for determining a battery charge level of the first wireless device, where selecting the first beam of the set of multiple the first layer beams, the second beam of the set of multiple the first layer beams, or both may be based on the battery charge level of the first wireless device.

Some examples of the method, apparatuses, and non-transitory computer-readable medium described herein may further include operations, features, means, or instructions for determining a latency and link reliability condition for the communicating with the second wireless device, where selecting the first beam of the set of multiple the first layer beams, the second beam of the set of multiple the first layer beams, or both may be based on determining the latency and link reliability condition for the communicating with the second wireless device.

Some examples of the method, apparatuses, and non-transitory computer-readable medium described herein may further include operations, features, means, or instructions for measuring a third beam selection parameter for each beam of a set of multiple second layer beams associated with the second beam based on selecting the second beam and selecting a beam of the set of multiple the second layer beams associated with the second beam based on measuring the first beam selection parameter and measuring the third beam selection parameter.

Some examples of the method, apparatuses, and non-transitory computer-readable medium described herein may further include operations, features, means, or instructions for determining the set of multiple the first layer beams, the set of multiple the second layer beams, or both include the multipath beams based on sensing multiple directional beams with signal measurements that fall within a range of each other for the multiple directional beams.

In some examples of the method, apparatuses, and non-transitory computer-readable medium described herein, the set of multiple the first layer beams, the set of multiple the second layer beams, or both may be determined based on one or more of a machine learning procedure or a beam characterization procedure for different multipath conditions or simulated channel models.

BRIEF DESCRIPTION OF THE DRAWINGS

FIGS. 3A, 3B, 3C, and 3D illustrate examples of operations of a beam selection procedure that supports beam management with backtracking and dithering in accordance with aspects of the present disclosure.

DETAILED DESCRIPTION

Figure 1:
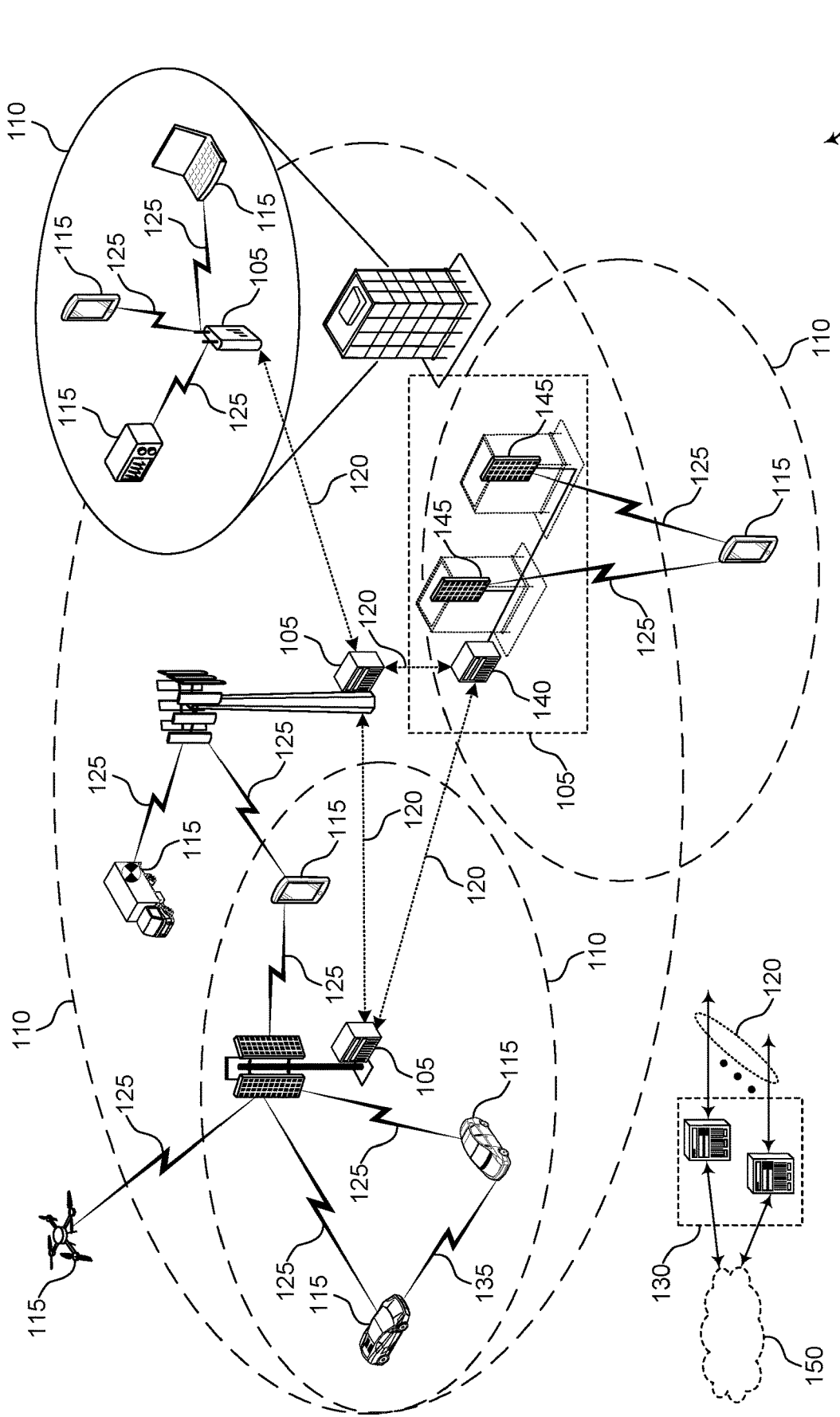
FIG. 1 illustrates an example of a wireless communications system that supports beam management with backtracking and dithering in accordance with aspects of the present disclosure.

In wireless communications, a user equipment (UE) (for example, a first wireless device) may perform a beam selection procedure to determine and select one or more relatively best beams for communicating with a wireless device (for example, base station, additional UE, or another wireless device). For example, the UE may first select a first beam from a set of first layer beams (for example, broad layer 1 (L1) beams) based on, for example, a power measurement comparison between multiple first layer beams (for example, may select an L1 beam from the multiple L1 beams that has a relatively highest power measurement). Based on the selected first layer beam, the UE may determine multiple higher directivity child beams (for example, narrower layer 2 (L2) beams) corresponding to the selected first layer beam, and then select one of these narrower child beams based on an additional power measurement comparison of the narrower child beams (for example, may select an L2 beam from the multiple L2 beams that has a relatively highest power measurement). The UE may continue this process until a final beam with a highest received power has been determined and selected to then communicate with the wireless device using the final selected beam. However, if there are multiple first layer beams with relatively similar power measurements, the UE may initially select an incorrect beam such that the subsequent child beams associated with this incorrect beam point farther away from the wireless device, resulting in a sub-optimal final beam selection, among other disadvantages.

Various aspects generally relate to a beam selection procedure, and more specifically, to using backtracking and dithering techniques to determine a beam for communications with a wireless device when a beam selection algorithm determines the beam selection procedure is unable to find a most optimal beam for the communications. For example, a UE may first select a first beam from a set of first layer beams (for example, broad L1 beams) based on a beam selection parameter (for example, power measurement) measured for at least some beams, if not each beam, of the set of first layer beams. Subsequently, based on selecting the first beam, the UE may then measure a beam selection parameter (for example, the same beam selection parameter, a different beam selection parameter) for multiple child beams (for example, narrower L2 beams) associated with the first beam. However, if the beam selection parameter measured for each of the multiple child beams is worse than the beam selection parameter for the first beam, the UE may then select a second beam from the set of first layer beams and repeat the algorithm until an adequate beam (for example, a beam or a combination of multiple beams with a best measurement of the beam selection parameter, such as a highest received power from the base station or a lowest desense energy) has been found. That is, upon determining the multiple child beams of a selected beam are worse than the selected beam (for example, have a relatively lower beam selection parameter), the UE may reattempt the process using a different beam than the initially selected beam (for example, backtracking).

In some examples, the UE may select the second beam from the set of first layer beams at random from a set of beams that are neighbors of the initially selected first beam of the set of first layer beams (for example, a first option of dithering). Additionally or alternatively, the UE may add noise to the selected first beam after determining the child beams for the selected first beam are worse or purposely select a different beam than the selected first beam using a predetermined algorithm or in a pseudo-random manner (for example, a second option of dithering), so that a likelihood is increased that the second beam from the set of first layer beams is different than the initially selected first beam (for example, the added noise results in the initially selected first beam having a different radiation pattern, affecting the measured beam selection parameter of the first beam and thereby lessening a likelihood the first beam would be selected again). Based on these described techniques of backtracking and dithering, the UE may support picking a different branch of a next hierarchical family of beams to move outside of a local maxima in an attempt to get to a global maxima for determining a beam for communications with a wireless device.

Particular aspects of the subject matter described in this disclosure may be implemented to realize one or more of the following potential advantages. The techniques employed by the described communication devices may provide benefits and enhancements to the operation of the communication devices, including determining a more optimal beam for communications with an additional wireless device in an efficient and effective manner. For example, operations performed by the described communication devices may provide improvements to beam measurements, beam selection procedures, and beam selection algorithms. In some implementations, the operations performed by the described communication devices to backtrack or apply dithering may increase a likelihood that a more optimal beam for the communications with the additional wireless device.

Aspects of the disclosure are initially described in the context of wireless communications systems. Additionally, aspects of the disclosure are illustrated through an additional wireless communications system, operations of a beam selection procedure, a flowchart, a dithering technique, communications paths, and a process flow. Aspects of the disclosure are further illustrated by and described with reference to apparatus diagrams, system diagrams, and flowcharts that relate to beam management with backtracking and dithering.

FIG. 1 illustrates an example of a wireless communications system 100 that supports beam management with backtracking and dithering in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (for example, mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (for example, core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (for example, via an S1, N2, N3, or other interface). The base stations 105 may communicate with one another over the backhaul links 120 (for example, via an X2, Xn, or other interface) either directly (for example, directly between base stations 105), or indirectly (for example, via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, in which the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (for example, a bandwidth part (BWP)) that is operated according to one or more physical layer channels for a given radio access technology (for example, LTE, LTE-A, LTE-A Pro, NR). Each physical layer channel may carry acquisition signaling (for example, synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (for example, in a carrier aggregation configuration), a carrier may also have acquisition signaling or control signaling that coordinates operations for other carriers. A carrier may be associated with a frequency channel (for example, an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode in which initial acquisition and connection may be conducted by the UEs 115 via the carrier, or the carrier may be operated in a non-standalone mode in which a connection is anchored using a different carrier (for example, of the same or a different radio access technology).

The communication links 125 shown in the wireless communications system 100 may include uplink transmissions from a UE 115 to a base station 105, or downlink transmissions from a base station 105 to a UE 115. Carriers may carry downlink or uplink communications (for example, in an FDD mode) or may be configured to carry downlink and uplink communications (for example, in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (for example, 1.4, 3, 5, 10, 15, 20, 40, or 80 megahertz (MHz)). Devices of the wireless communications system 100 (for example, the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (for example, a sub-band, a BWP) or all of a carrier bandwidth.

Signal waveforms transmitted over a carrier may be made up of multiple subcarriers (for example, using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (for example, a duration of one modulation symbol) and one subcarrier, in which the symbol period and subcarrier spacing are inversely related. The number of bits carried by each resource element may depend on the modulation scheme (for example, the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (for example, spatial layers or beams), and the use of multiple spatial layers may further increase the data rate or data integrity for communications with a UE 115.

One or more numerologies for a carrier may be supported, in which a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the base stations 105 or the UEs 115 may be expressed in multiples of a basic time unit which may, for example, refer to a sampling period of $T_s = 1/(\Delta f_{max} \cdot N_f)$ seconds, in which $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (for example, 10 milliseconds (ms)). Each radio frame may be identified by a system frame number (SFN) (for example, ranging from 0 to 1023).

Each frame may include multiple consecutively numbered subframes or slots, and each subframe or slot may have the same duration. In some examples, a frame may be divided (for example, in the time domain) into subframes, and each subframe may be further divided into a number of slots. Alternatively, each frame may include a variable number of slots, and the number of slots may depend on subcarrier spacing. Each slot may include a number of symbol periods (for example, depending on the length of the cyclic prefix prepended to each symbol period). In some wireless communications systems 100, a slot may further be divided into multiple mini-slots containing one or more symbols. Excluding the cyclic prefix, each symbol period may contain one or more (for example, $N_f$) sampling periods. The duration of a symbol period may depend on the subcarrier spacing or frequency band of operation.

A subframe, a slot, a mini-slot, or a symbol may be the smallest scheduling unit (for example, in the time domain) of the wireless communications system 100 and may be referred to as a transmission time interval (TTI). In some examples, the TTI duration (for example, the number of symbol periods in a TTI) may be variable. Additionally or alternatively, the smallest scheduling unit of the wireless communications system 100 may be dynamically selected (for example, in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (for example, a control resource set (CORESET)) for a physical control channel may be defined by a number of symbol periods and may extend across the system bandwidth or a subset of the system bandwidth of the carrier. One or more control regions (for example, CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (for example, control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or any combination thereof. The term "cell" may refer to a logical communication entity used for communication with a base station 105 (for example, over a carrier) and may be associated with an identifier for distinguishing neighboring cells (for example, a physical cell identifier (PCID), a virtual cell identifier (VCID), or others). In some examples, a cell may also refer to a geographic coverage area 110 or a portion of a geographic coverage area 110 (for example, a sector) over which the logical communication entity operates. Such cells may range from smaller areas (for example, a structure, a subset of structure) to larger areas depending on various factors such as the capabilities of the base station 105. For example, a cell may be or include a building, a subset of a building, or exterior spaces between or overlapping with geographic coverage areas 110, among other examples.

A macro cell generally covers a relatively large geographic area (for example, several kilometers in radius) and may allow unrestricted access by the UEs 115 with service subscriptions with the network provider supporting the macro cell. A small cell may be associated with a lower-powered base station 105, as compared with a macro cell, and a small cell may operate in the same or different (for example, licensed, unlicensed) frequency bands as macro cells. Small cells may provide unrestricted access to the UEs 115 with service subscriptions with the network provider or may provide restricted access to the UEs 115 having an association with the small cell (for example, the UEs 115 in a closed subscriber group (CSG), the UEs 115 associated with users in a home or office). A base station 105 may support one or multiple cells and may also support communications over the one or more cells using one or multiple component carriers.

In some examples, a carrier may support multiple cells, and different cells may be configured according to different protocol types (for example, MTC, narrowband IoT (NB- IoT), enhanced mobile broadband (eMBB)) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (for example, mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (for example, using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

In some systems, the D2D communication link 135 may be an example of a communication channel, such as a sidelink communication channel, between vehicles (for example, UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (for example, base stations 105) using vehicle-to-network (V2N) communications, or with both.

The core network 130 may provide user authentication, access authorization, tracking, Internet Protocol (IP) connectivity, and other access, routing, or mobility functions.

The core network 130 may be an evolved packet core (EPC) or 5G core (5GC), which may include at least one control plane entity that manages access and mobility (for example, a mobility management entity (MME), an access and mobility management function (AMF)) and at least one user plane entity that routes packets or interconnects to external networks (for example, a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (for example, radio heads and ANCs) or consolidated into a single network device (for example, a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (for example, less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (for example, from 30 GHz to 300 GHz), also known as the millimeter band. In some examples, the wireless communications system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (for example, LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (for example, the same codeword) or different data streams (for example, different codewords). Different spatial layers may be associated with different antenna ports used for channel measurement and reporting. MIMO techniques include single-user MIMO (SU-MIMO), in which multiple spatial layers are transmitted to the same receiving device, and multiple-user MIMO (MU-MIMO), in which multiple spatial layers are transmitted to multiple devices.

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (for example, using a cyclic redundancy check (CRC)), forward error correction (FEC), and retransmission (for example, automatic repeat request (ARQ)). HARQ may improve throughput at the MAC layer in poor radio conditions (for example, low signal-to-noise conditions). In some examples, a device may support same-slot HARQ feedback, in which the device may provide HARQ feedback in a specific slot for data received in a previous symbol in the slot. In other cases, the device may provide HARQ feedback in a subsequent slot, or according to some other time interval.

Beamforming, which may also be referred to as spatial filtering, directional transmission, or directional reception, is a signal processing technique that may be used at a transmitting device or a receiving device (for example, a base station 105, a UE 115) to shape or steer an antenna beam (for example, a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (for example, with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (for example, antenna panels) to conduct beamforming operations for directional communications with a UE 115. Some signals (for example, synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (for example, by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (for example, a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (for example, by a base station 105 or a UE 115) may be performed using multiple beam directions, and the device may use a combination of digital precoding or radio frequency beamforming to generate a combined beam for transmission (for example, from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (for example, a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (for example, a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (for example, for identifying a beam direction for subsequent transmission or reception by the UE 115) or for transmitting a signal in a single direction (for example, for transmitting data to a receiving device).

A receiving device (for example, a UE 115) may try multiple receive configurations (for example, directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (for example, different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (for example, when receiving a data signal). The single receive configuration may be aligned in a beam direction determined based on listening according to different receive configuration directions (for example, a beam direction determined to have a highest signal strength, highest signal-to-noise ratio (SNR), or otherwise acceptable signal quality based on listening according to multiple beam directions).

In some cases, beams on a same layer may have a same number of elements activated in a phase array (for example, each layer may include a same number of antenna elements from an antenna array used to produce beams for that layer), and thus, beams on the same layer may be likely to have less directivity than beams on an upper or subsequent layer, which may have more elements activated (for example, a higher number of activated elements may result in more control on how a beam is formed and directed). For example, L1 beams may have one (1) element activated (for example, one antenna element is used to produce a beam for the L1 beams), while L2 beams have two (2) elements activated. In some implementation, Phased Array Antennas (PAAs) with more elements activated may be used to construct beamforming radiation patterns that have higher directivity than PAA employing fewer active elements. Additionally, beams on different layers may be referred to as parent and child (or children) beams based on a hierarchy of beam branches. Beams on a higher layer (for example, a second layer or L2 beams) may be called the child beams of an associated lower layer beam (for example, a first layer or L1 beams) when all elements activated in the associated lower layer beam can be found in the higher layer beam, where the associated lower layer beam may be called a parent beam. The child beams may inherit all elements that are used to produce the corresponding parent beam.

A wireless device (for example, a UE 115 or a base station 105) may use a beam search algorithm to determine a beam for communications with an additional wireless device (for example, selecting an optimal single beam or multiple beam patterns). For example, the beam search algorithm may begin with least directivity beam patterns (for example, lower layer beams, such as L1 or L2 beams) and then may refine the least directivity beam patterns to a higher directivity beam (for example, Layer 3 (L3) or Layer 4 (L4) beams) by comparing power received from different beamforming patterns. The least directivity beam patterns may include a least number of element excited in a beamforming PAA module. Additionally, a beam with a least number of elements excited may be a parent beam of all child (or children) and grandchild (or grandchildren) beams that derive from the beam, using a same beamforming PAA module.

Each module may include a "root" parent beam. For example, a first beam may include a single excited element to produce the first beam, child beams corresponding to this first beam may each include two excited elements with at least the single excited element as one of the two excited elements, and grandchild beams corresponding to each of the child beams may include three excited elements with at least the two excited elements used to produce a corresponding child beam of a given grandchild beam. This designation of parent, child, grandchild beams, and so on may be extended to different number of activated elements. For example, beams higher in a hierarchy of beams with a less number of activated elements are referred to as parent beams for beams lower in the hierarchy of beams with higher number of activated elements, and the beams lower in the hierarchy are referred to as child beams for the beams higher in the hierarchy.

In some examples, if performing a beam selection procedure to determine a beam for communications with a wireless device, a UE 115 may be oriented at angles in which two or more beams may relate to a similar power level for received signals from the wireless device, resulting in issues using a beam searching. For example, the UE 115 may experience issues based on a search algorithm utilized by the UE 115 not being able to effectively determine which branch of beams is the correct one based on a power comparison of a set of first layer beams alone. Subsequently, if the UE 115 selects a wrong first layer beam, any subsequent upper layer beams (for example, narrower beams that depend on the first layer beam) may not point to the wireless device properly. For example, child beam coverage (such as, subsequent upper layer coverage) may lie within bounds of a corresponding parent beam (such as, lower layer beam coverage) (for example, the children beams may include narrower beams that fall within the area of a broader parent beam), meaning children beams may not point outside of a parent beam coverage due to what phase array is used to produce the children beams and how the beams are constructed. If a wrong parent beam is selected, any associated children beams for that parent beam may not be able to point to the wireless device better than the parent beam. Consequently, if a wrong parent beam is selected by the UE 115, a beam selection algorithm may reach an impasse and inaccurately select the parent beam (for example, a lower level L1 beam) as none of the children beam can receive a higher power than the parent beam.

For example, based on a boundary orientation of the UE 115, the UE 115 may receive similar power levels from a wireless device for transmissions from the wireless device at a particular angle orientation. In some cases, the UE 115 may select a first beam based on a slightly higher power level received for the first beam. However, the UE 115 may inaccurately select children beams corresponding to the first beam, even though better higher-layer beams may correspond to a different beam. Despite the children beams having relatively higher directivity, the children beams corresponding to the first beam may have lower power than the first beam (for example, a corresponding parent beam) because the children beams cannot physically "point" to the wireless device. Because multiple children beams may come from a same parent beam, a search among the children beams may not resolve this problem of the children beams having a lower power, and the UE 115 may be fixed at low power until a beam search is abandoned, resulting in the UE 115 staying at lower level beam (for example, L1 or L2 beams).

Wireless communications system 100 may support efficient techniques for a UE 115 to determine and select a relatively best beam for communications with a wireless device by using backtracking and dithering. For example, upon detecting a selected beam is a wrong beam for a beam selection procedure, the UE 115 may revert to a previous operation to select a different beam than the initially selected beam. After selecting this different beam, the UE 115 may then continue the beam selection procedure by measuring a beam selection parameter for children beams for the different beam to refine a beam for the communications with the wireless device. Additionally, after detecting a selected beam is a wrong beam for a beam selection procedure, the UE 115 may apply dithering to the wrongly selected beam to decrease chances that the same beam is selected a second time for the beam selection procedure.

Figure 2:
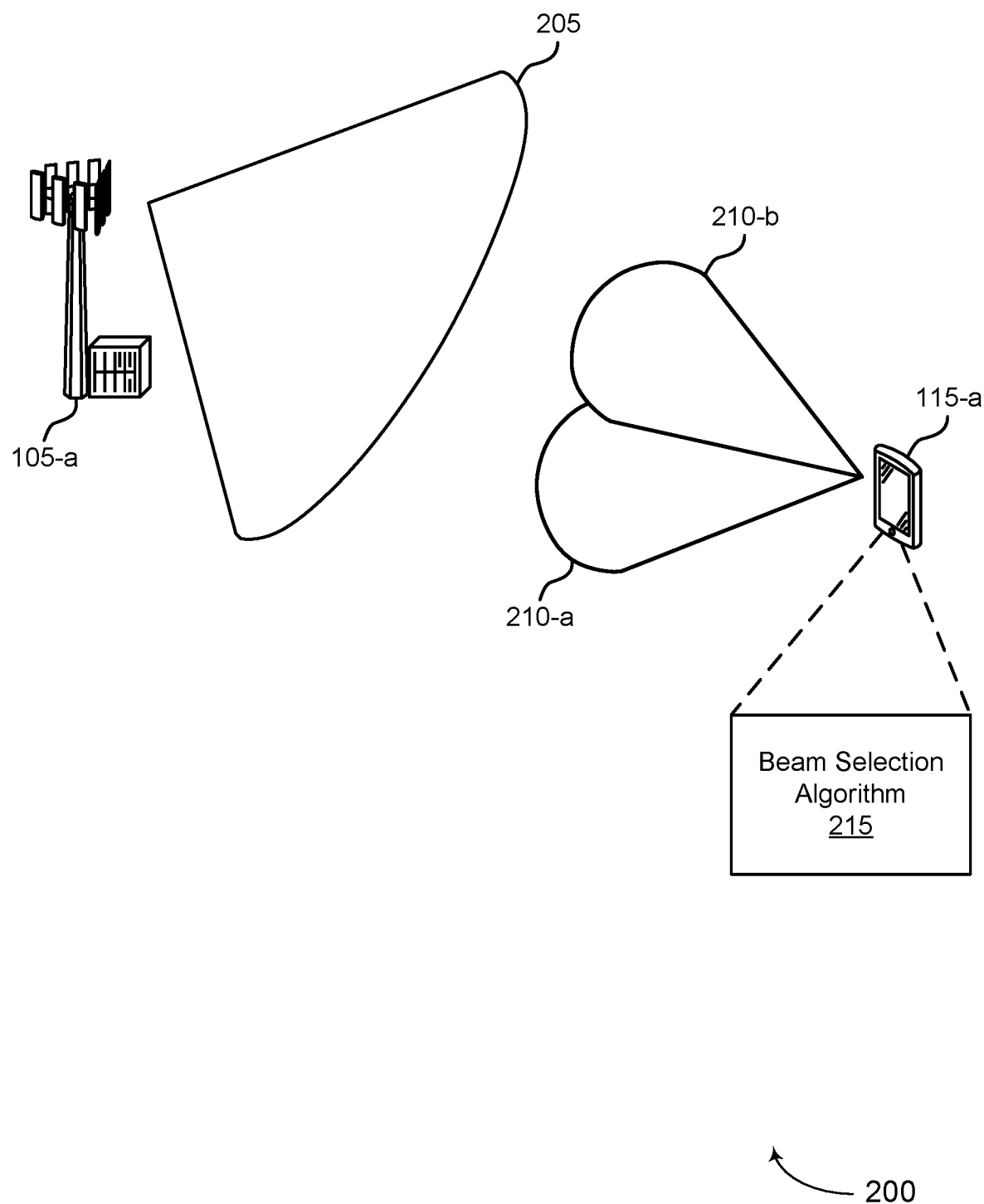
FIG. 2 illustrates an example of a wireless communications system that supports beam management with backtracking and dithering in accordance with aspects of the present disclosure.

FIG. 2 illustrates an example of a wireless communications system 200 that supports beam management with backtracking and dithering in accordance with aspects of the present disclosure. The wireless communications system 200 may implement aspects of wireless communications system 100. For example, the wireless communications system 200 may illustrate an example of wireless communications between a base station 105-a and a UE 115-a, which may represent corresponding base stations 105 and UEs 115, respectively, as described with reference to FIG. 1. Additionally, the base station 105-a and the UE 115-a may support beamformed communications as described with reference to FIG. 1 to transmit and receive messages to and from each other. For example, the base station 105-a may use a beam 205 to communicate (that is, transmit, receive, or both) with the UE 115-a, and the UE 115-a may use a beam 210 to communicate with the base station 105-a. In some examples, the UE 115-a may determine an option for the beam 210, such as a first beam 210-a or a second beam 210-b, over which to communicate with the base station 105-a based on results of a beam selection algorithm 215.

Using the beam selection algorithm 215, the UE 115-a may first select one of the beams 210 for communicating with the base station 105-a based on a beam selection parameter for transmissions received from the base station 105-a (for example, reference signals). For example, the base station 105-a may transmit one or more signals using the beam 205. The UE 115-a may then receive the signals, for example, on both the first beam 210-a and the second beam 210-b. The UE 115-a may select one of the beams 210 based on measuring a received power of the signals using both beams 210. In some implementations, the UE 115-a may select the first beam 210-a based on a received power measurement of the signals being higher than a received power measurement of the signals for the second beam 210-b. Additionally, the beams 210 may include first layer beams (for example, L1 beams) that are root parent beams with broadest coverage radiation patterns, and if the UE 115-a does not know where the base station 105-a is located upon waking up, the beam selection algorithm 215 may begin with these first layer beams.

Subsequently, the UE 115-a may perform a beam refinement procedure (or a subsequent operation of a beam selection procedure using the beam selection algorithm 215) to determine and select a narrower beam that corresponds to the first beam 210-a. For example, the UE 115-a may determine one or more child beams (for example, narrower beams) that correspond to the first beam 210-a and use the beam selection parameter (for example, received signal power measurement) to select a child beam. The UE 115-a may continue to refine the selected beams until any subsequently identified beams cannot achieve a better beam selection parameter measurement of a previously measured beam during a search loop time slot for the beam selection procedure and, the UE 115-a may then use this previously measured beam for the communications with the base station 105-a. Additionally, while power measurements are described with reference to the beam selection parameter for the beam selection algorithm 215, one or more different selection parameters may be used to refine a beam 210 for communications with the base station 105-a. For example, the one or more different selection parameters may include a desense energy measurement for how other technologies affect different beams, battery consumption of different beams, latency measurements of different beams, reliability measurements of different beams, or an additional parameter.

In some implementations, however, the beam selection parameter (for example, received signal power measurement) for the first beam 210-a and the second beam 210-b may be similar in magnitude, such that the UE 115-a is unsure which beam 210 to select. Subsequently, the UE 115-a may select an incorrect beam 210 based on the beam selection parameter being similar for both beams 210, in which the child beams of the selected beam do not point in the direction of the base station 105-a. For example, if the UE 115-a selects the first beam 210-a at an onset of the beam selection procedure using beam selection algorithm 215, the UE 115-a may then determine child beams that correspond to the first beam 210-a are pointing farther away from the base station 105-*a* based on the beam selection parameter for the child beams being worse (for example, less) than the beam selection parameter for the first beam 210-*a*. That is, the UE 115-*a* may select a wrong beam for the beam selection procedure using the beam selection algorithm based on an ambiguity of the beam selection parameter for the first beam 210-*a* and the second beam 210-*b*. The UE 115-*a* may then use a sub-optimal beam for communications with the base station 105-*a* by using subsequent child beams for the beam selection procedure that correspond to the wrong beam (for example, causing transient performance loss).

Rather than continuing with the beam selection procedure using the wrong beam (for example, the first beam 210-*a*), upon detection that the selected beam is a wrong beam (for example, based on determining one or more measurements of one or more beam selection parameters), the UE 115-*a* may backtrack and revert to a previous part of the beam selection procedure to select a different beam to perform the beam selection procedure. For example, after selecting the first beam 210-*a*, the UE 115-*a* may measure the beam selection parameter for the child beams of the first beam 210-*a* and may determine that the beam selection parameter for each of the child beams is worse than a measurement of the beam selection parameter for the first beam 210-*a* (that is, the child beams for the first beam 210-*a* are pointing farther away from base station 105-*a*). Rather than proceeding with using these child beams that correspond to the first beam 210-*a* to refine a beam for communications with the base station 105-*a*, the UE 115-*a* may go back and select the second beam 210-*b* to perform the beam selection procedure using the beam selection algorithm 215. This backtracking technique is described in more detail with reference to FIGS. 3 and 4.

In some implementations, upon detection that the first beam 210-*a* is the wrong beam and before selecting the second beam 210-*b*, the UE 115-*a* may apply dithering to the first beam 210-*a* to increase chances that the first beam 210-*a* is not selected again if going back to perform the beam selection procedure (that is, dithering may include applying an arbitrary signal or noise to the first beam 210-*a* to change a beam pattern for the first beam 210-*a*). In some examples, the dithering may enable the UE 115-*a* to escape being stuck in (for example, wiggle out of) a loop searching for an optimal beam, where a same wrong beam is continuously selected for the beam selection procedure based on a measurement of a beam selection parameter for the wrong beam being more optimal than other beams even though the child beams of the wrong beam are less optimal for communications. For example, an applied arbitrary signal or noise may adjust the wrong beam in such a way that the UE 115-*a* gets outside of a bad local maxima in order to get to a global maxima. This dithering technique is described in more detail with reference to FIGS. 4 and 5, among other sections.

In some implementations, as part of using the beam selection algorithm 215, the UE 115-*a* may detect an amount of desense (for example, degradation in sensitivity due to an increase of exposed energy coming from other mechanisms or wireless technologies operating at a same time as using the beam selection algorithm 215) experienced by the other systems of the UE 115-*a* (for example, LTE, global positioning system (GPS), wireless fidelity (Wi-Fi) protocols) by measuring a signal at different antennae while the other systems are running. A table of different beam identifiers (IDs) to avoid may be developed and saved, for example, in the memory of the UE 115-*a*. The UE 115-*a* may then reference this table during the beam selection procedure using the beam selection algorithm 215 if other technologies (for example, LTE, GPS, Wi-Fi) are also used during the beam selection procedure in a same time slot. For example, if the UE 115-*a* is using GPS while employing the beams 210 (for example, mmW beams), the UE 115-*a* may reference beams to avoid in the table based on one or more beams previously determined as being the relatively strongest offending beams that desensitize GPS operation. Additionally or alternatively, the beams 210 may be interfered with by the other technologies, and the UE 115-*a* may select a different set of beams or a different antenna array (for example, PAA) to sustain a best performance using the beam selection parameter (for example, throughput, latency, reliability, battery consumption, or a different parameter) in the presence of interference from another technology.

In some implementations, when measuring an amount of desense, the UE 115-*a*, with two parent beams, may pick up energy from the base station 105-*a* on each beam respectively while operating other systems, but an amount of desense experienced by a receiver using one of the other systems of the UE 115-*a* (for example, a GPS receiver) may be different when a first parent beam is used as compared to when a second parent beam is used. For example, when the measured beam selection parameter for using the beam selection algorithm 215 includes finding a lower desense experience by another system of the UE 115-*a* (for example, GPS), the measurements of the beam selection parameter may occur on a receiver configured for the other system (for example, a GPS receiver and not a receiver used for the beam selection procedure).

Additionally or alternatively, the UE 115-*a* may measure a current battery consumption for different beam IDs. Subsequently, if the UE 115-*a* detects a low battery level, any beams that have been characterized to be most power consuming based on the battery consumption measurements may be banned for use (for example, as part of a beam selection procedure or for current communications). For example, during the beam selection procedure using the beam selection algorithm 215, the UE 115-*a* may verify that its battery is above a certain threshold before selecting which beams 210 to use with the beam selection procedure from a pool of usable beam IDs based on the battery level of the UE 115-*a*. In some implementations, the UE 115-*a* may measure how other factors affect different beam IDs. For example, the UE 115-*a* may determine how different beams are affected by extreme environmental conditions, such as extreme heat or extreme cold, or how different beams are affected when different UE operating conditions are impaired with different scenarios, such as hand gripping, when the UE 115-*a* is placed within a bag, or a part of the UE 115-*a* becomes damaged (for example, one PAA module gets damaged). For mitigation of these different factors (including the battery consumption), in addition to identifying alternate beams to select, the UE 115-*a* may modify other methods of transmission and control, such as updating time slots for using the beam selection algorithm 215, adjusting hysteresis levels, changing modulation, using different component carriers or resource blocks, and adjusting power levels or a Maximum Power Reduction (MPR).

Additionally or alternatively, the UE 115-*a* may measure latency and link reliability in a multipath fading environment (simulated or real world) for different beam IDs. Subsequently, if the UE 115-*a* engages in a mission critical application (for example, V2V communications, V2X communications, URLLC), the UE 115-*a* may select a beam based on the measured latency and link reliabilities to maintain a consistent link. That is, the UE 115-a may determine a limited subset of available beam IDs (and modulation, with Quadrature Phase Shift Keying (QPSK) preferred over 64 quadrature amplitude modulation (QAM) for a mission critical link) that can be selected for the beam selection procedure using the beam selection algorithm 215.

If determining beams 210 with which to run the beam selection algorithm 215, the UE 115-a may use the above criteria (for example, desense experience for other systems or technologies, battery consumption, or latency and reliability measurements) or may use additional criteria. For example, the UE 115-a may determine a set of candidate beams for running the beam selection procedure based on one or more of a hand grip, a thermal mitigation, or a machine learning, or other aspects. For the hand grip aspect, the UE 115-a may collect measurements (for example, electric field (e-field) measurements) for a phantom hand (that is, different positions that a hand may hold the UE 115-a), for computer simulated fading, and for multipath channel conditions, and the UE 115-a may then generate a list of candidate beams to test and measure for the beam selection procedure. Additionally or alternatively, for the thermal mitigation aspect, the UE 115-a may simulate thermal mitigation scenarios to generate a candidate set of beams that extend beyond the nominal adjacent beam lists.

For the machine learning aspect, data collected from offline measurements (for example, offline training during a design phase for the UE 115-a or when the UE 115-a is in a training mode) may be used to augment a list of candidate beams, which may include different emulations of different use cases and environmental conditions (for example, channel models). Additionally or alternatively, online learning algorithms (for example, beam selection algorithm 215), such as reinforcement learning, may suggest candidate beams on the fly (that is, while in operation). The UE 115-a may collect training data for determining candidate beams and may send this data to the base station 105-a. The data may then be trained on the network via the base station 105-a, and the base station 105-a may send a model back to the UE 115-a based on the trained data to support the UE 115-a determining a candidate set of beams to perform the beam selection procedure (for example, using beam selection algorithm 215), as described herein.

In some implementations, the beam selection procedure using the beam selection algorithm 215 may be happening continuously at all times with very short time intervals. Additionally, a hysteresis may be built in to the continuous beam selection procedure such that if a next identified beam corresponding to a previously-selected beam (for example, lower layer beam) is found but has a power improvement less than a threshold value (for example, the next identified beam includes x decibels (dB) of improvement over the previously-selected beam, in which the x dB is a small number and lower than the threshold value), the beam selection algorithm 215 may keep using the previously-selected beam to limit the number of beam switches.

While the UE 115-a is shown using the beam selection algorithm 215 as part of the beam selection procedure to determine an optimal beam for communications with the base station 105-a, the described techniques may also or alternatively be used by the base station 105-a to determine an optimal beam for the base station 105-a, for the UE 115-a, or both. For example, the described techniques may also apply for coordinating use of beams at the base station 105-a, in which the techniques can be independently done on the base station 105-a, on the UE 115-a, or on both in a same beam management system. In some implementations, utilizing beam control on both the UE 115-a and the base station 105-a may make the wireless communications system 200 and the described beam selection procedure using the beam selection algorithm 215 more efficient. Additionally, the backtrack and dithering procedures may be applied the same on the system that incorporates beams from both the UE 115-a and the base station 105-a together. That is, a synergy may exist between beam selection procedures at both the UE 115-a and the base station 105-a, in which the UE 115-a and the base station 105-a may determine beams for themselves, for each other, or both and then may signal the determined beams to each other.

Additionally, while the described techniques are used for performing the beam selection procedure that starts with lower layer parent beams and refines those parent beams to more optimal, higher layer child beams, the described techniques may also be applied to different methods of beam selection or beam searching. For example, the beam selection algorithm 215 may start from more directed beams (such as, upper layer beams or high directivity beams) and may proceed downward to broad-side, lower layer beams. Additionally or alternatively, the beam selection algorithm 215 may be used with stochastic models on randomized beam selections (for example, like a stochastic route selection algorithm for a smart vacuum cleaner) or other non-traditional approaches. In some examples, dithering and backtracking may be beneficial to these different methods.

FIGS. 3A, 3B, 3C, and 3D illustrate examples of operations 300, 301, 302, and 303, respectively, of a beam selection procedure that supports beam management with backtracking and dithering in accordance with aspects of the present disclosure. The operations 300, 301, 302, and 303 of the beam selection procedure may be implemented by or may implement aspects of wireless communications systems 100 and 200. For example, the operations 300, 301, 302, and 303 of the beam selection procedure may include a UE 115-b and a base station 105-b, which may represent examples of UEs 115 and base stations 105, respectively, as described with reference to FIGS. 1 and 2. The UE 115-b may attempt communications with the base station 105-b over a beam by selecting a first beam from a first set of beams and then selecting a more narrow beam from a second set of beams corresponding to the selected first beam of the first set of beams. The beams in each set may be selected according to the beam selection algorithm as described with reference to FIG. 2.

For the operation 300, the UE 115-b may first determine the first set of beams. For example, the UE 115-b may determine a candidate set of beams for performing the beam selection procedure based on different factors as described with reference to FIG. 2 (for example, desense experience for other systems or technologies, battery consumption, latency and reliability measurements, different operating conditions of the UE 115-b, thermal mitigations, and machine learning models). In some implementations, different operating conditions of the UE 115-b may include a hand grip, whether the UE 115-b is in a bag, moisture in the atmosphere, foliage shadow, if the UE 115-b is a fast moving vehicle, if the UE 115-b is an outer space satellite in presence of cosmic rays, if the UE 115-b is damaged UE, or another operating condition for the UE 115-b. After the first set of beams (that is, the candidate set of beams) is determined, the UE 115-b may then monitor for transmissions (for example, reference signals) from the base station 105-b on each of the beams of the first set of beams. For example, the first set of beams may include a first beam 305-a and a second beam 305-b (for example, first layer beams or L1 beams), and the UE 115-*b* may use both beams 305 to monitor for and receive transmissions from the base station 105-*b*.

Subsequently, in some examples, using the beam selection algorithm, the UE 115-*b* may select the first beam 305-*a* based on a measurement of a beam selection parameter (for example, a received signal power measurement, a reference signal received power (RSRP) measurement, a reference signal strength indicator (RSSI) measurement, or a different beam selection parameter) as part of performing the beam selection procedure. In some examples, the measurements of the beam selection parameter for the first beam 305-*a* and for the second beam 305-*b* may be close to each other, such that it may not be clear to the UE 115-*b* which beam 305 is an appropriate beam to perform or continue the beam selection procedure. However, the UE 115-*b* may select the first beam 305-*a* based on the measurement of the beam selection parameter for the first beam 305-*a* being at least slightly more optimal (for example, higher for a power measurement, lower for a desense energy, or another indication that the beam is better suited for communications) than then measurement of the beam selection parameter for the second beam 305-*b*.

For the operation 301, the UE 115-*b* may determine a second set of beams to continue the beam selection procedure (for example, beam refinement procedure) based on selecting the first beam 305-*a* from the first set of beams. For example, the second set of beams may include a first beam 310-*a*, a second beam 310-*b*, and a third beam 310-*c* that fall within the bounds (for example, area) of the first beam 305-*a* of the first set of beams. In some implementations, the second set of beams may be referred to as child beams or narrower beams (for example, second layer beams or L2 beams) that correspond the first beam 305-*a*. The UE 115-*b* may then measure a beam selection parameter of each beam 310 of the second set of beams corresponding to the first beam 305-*a* according to the beam selection algorithm. Subsequently, in some examples, the UE 115-*b* may determine that the measurements of the beam selection parameters for the first beam 310-*a*, the second beam 310-*b*, and the third beam 310-*c* of the second set of beams are each worse (for example, less) than the measurement of the beam selection parameter for the first beam 305-*a*.

Accordingly, the UE 115-*b* may determine that the first beam 305-*a* was incorrectly selected (for example, because the measurements of the first beam 305-*a* and the second beam 305-*b* being close to each other) based on the measurements of the beam selection parameters for each beam of the second set of beams being worse than the measurement of the beam selection parameter for the first beam 305-*a*. That is, the measurements of the beam selection parameters for each beam of the second set of beams being worse than the measurement of the beam selection parameter for the first beam 305-*a* may indicate that each beam of the second set of beams points farther away from the base station 105-*b* or is otherwise a sub-optimal beam for communications with the base station 105-*b* than the measurement of the beam selection parameter for the first beam 305-*b* had indicated. Thus, the UE 115-*b* may then backtrack to a different beam of the first set of beams (for example, a different wider beam than the first beam 305-*a*) to perform or continue the beam selection procedure according to the beam selection algorithm.

For the operation 302, the UE 115-*b* may backtrack to the first set of beams based on the measurements of the beam selection parameter for the second set of beams corresponding to the first beam 305-*a* performed during the operation 301 of the beam selection procedure being worse than the measurement of the beam selection parameter for the first beam 305-*a*. Subsequently, as shown, the UE 115-*b* may select the second beam 305-*b* of the first set of beams to continue the beam selection procedure. In some examples, UE 115-*b* may make the selection based on applying a dithering to the first beam 305-*a*, which is described in greater detail with reference to FIG. 5. Additionally, the UE 115-*b* may select the second beam 305-*b* from a set of neighbor beams corresponding to the initial choice of the first beam 305-*a*. Additionally or alternatively, in some examples, the UE 115-*b* may select the second beam 305-*b* of the first set of beams based on the initial measurements of the beam selection parameter for each beam of the first set of beams or based on a new set of measurements of the beam selection parameter for each beam of the first set of beams (for example, after applying the dithering).

For the operation 303, the UE 115-*b* may measure the beam selection parameter for each beam of a second set of beams corresponding to the second beam 305-*b* of the first set of beams. For example, the second set of beams corresponding to the second beam 305-*b* of the first set of beams may include a first beam 315-*a*, a second beam 315-*b*, and a third beam 315-*c* (for example, second layer beams or L2 beams corresponding to the second beam 305-*b*) that fall within the bounds (for example, area) of the second beam 305-*b*. Based on the measurements of the beam selection parameter for each beam 315 of the second set of beams corresponding to the second beam 305-*b*, the UE 115-*a* may select one of the beams 315 from the second set of beams for communications with the base station 105-*b*. For example, the measurements of the beams 315 may indicate that the first beam 315-*a* of the second set of beams is an optimal beam for communications with the base station 105-*b* (that is, the first beam 315-*a* points most directly toward the base station 105-*b* out of the second set of beams).

In some examples, the UE 115-*b* may select the first beam 315-*a* based on the measurement of the beam selection parameter being more optimal for the first beam 315-*a* compared to the measurements of the beam selection parameter for the second beam 315-*b* and the third beam 315-*c*, as well as the measurement of the beam selection parameter for the first beam 315-*a* being more optimal than the measurement of the beam selection parameter for the second beam 305-*b*. The UE 115-*b* may then use this first beam 315-*a* for communications with the base station 105-*b* (that is, ending the beam selection procedure) or may determine a third set of beams corresponding to the first beam 315-*a* of the second set of beams to continue the beam selection procedure using the beam selection algorithm.

In some implementations, while the operations 300, 301, 302, and 303 of the beam selection procedure are used to determine higher directivity or upper layer beams (for example, the beams 315 or subsequent higher layer beams), a most optimal beam may be selected by the UE 115-*b* (or different wireless device) that does not correspond to an upper layer beam. For example, the described beam selection algorithm may be implemented to determine a best beam (or a best set of multiple beams that work together) that includes a best beam selection parameter measured, which may not correspond to a higher directivity or upper layer beam. Thus, the described techniques may more generally prevent the UE 115-*b* from getting stuck using sub-optimal beams, for example by using backtracking and dithering.

Figure 4:
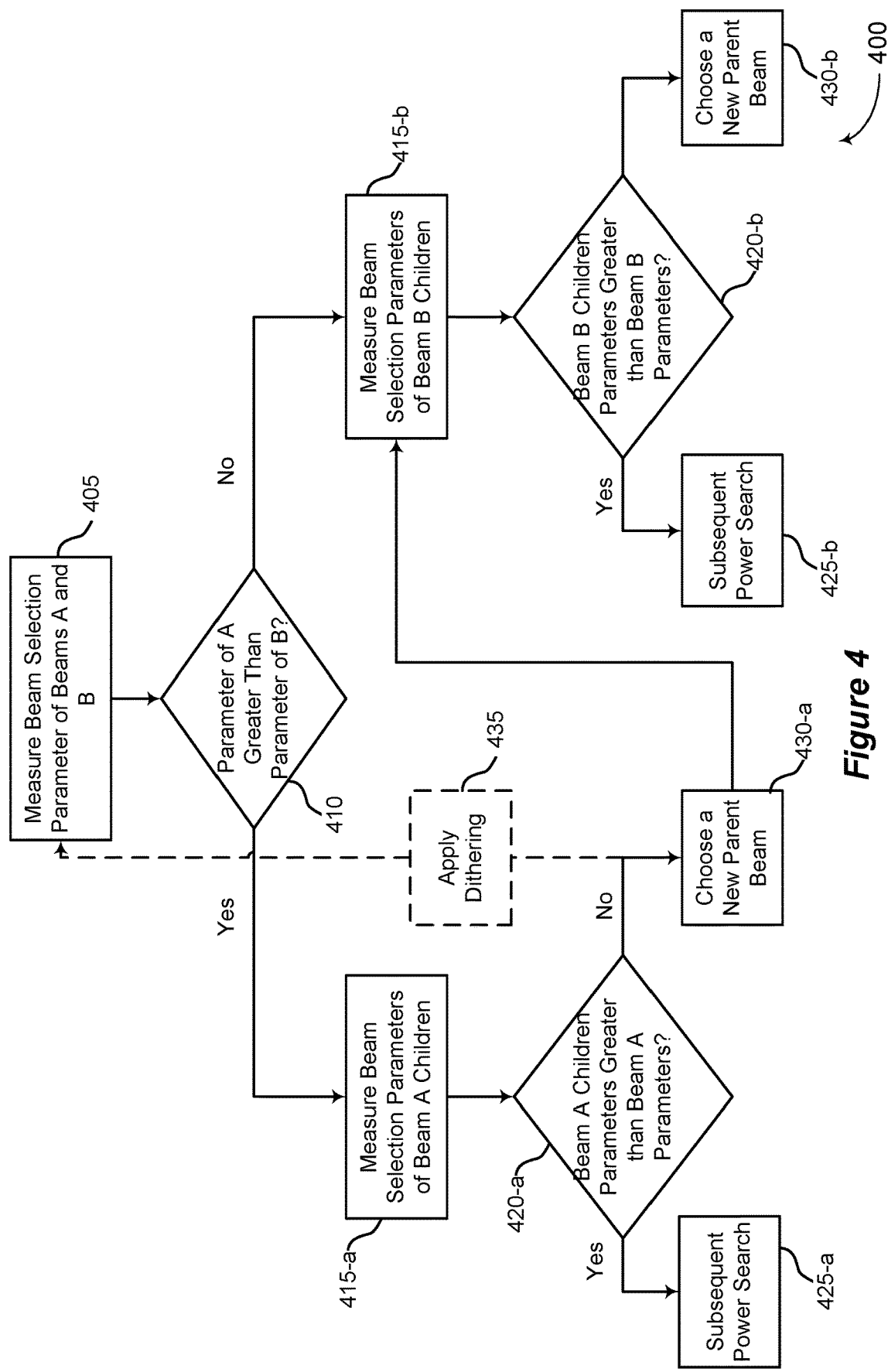
FIG. 4 illustrates an example of a flowchart that supports beam management with backtracking and dithering in accordance with aspects of the present disclosure.

FIG. 4 illustrates an example of a procedure 400 that supports beam management with backtracking and dithering in accordance with aspects of the present disclosure. The procedure 400 may be implemented by or may implement aspects of wireless communications systems 100 and 200. For example, a UE 115 (or an additional wireless device) may use the procedure 400 as part of a beam selection procedure (for example, a part of beam management) to refine and select a beam for communications with a base station 105 (or a different wireless device). Additionally, the procedure 400 may implement a beam selection algorithm as described with reference to FIGS. 2 and 3.

At 405, the UE 115 may measure a beam selection parameter for one or more beams, such as each beam, of a first set of beams (for example, in a first layer, such as L1 beams or a different layer), such as a beam A and a beam B. In some examples, the beam selection parameter may include a power measurement (such as a maximum power) of each beam. For example, the base station 105 may transmit one or more signals received by the UE 115 on each beam of the first set of beams, and the UE 115 may then measure a received power for the one or more signals on each beam of the first set of beams. The UE 115 may determine the first set of beams as described with reference to FIG. 2 for determining a candidate set of beams, based on signaling from the base station 105, or a combination thereof.

At 410, the UE 115 may determine a first beam (for example, a first parent beam) as part of performing the beam selection procedure based on the measurements acquired at 405. In some examples, the first beam may be an example of an L1 beam. Additionally, the UE 115 may determine that the first beam based on which beam of the first set of beams has a most optimal measurement (for example, a highest received power measurement, a lowest desense energy measurement, a lowest battery consumption measurement, a lowest latency measurement, or a highest reliability measurement) of the beam selection parameter.

At 415, the UE 115 may measure a beam selection parameter for each beam of a second set of beams corresponding to the determined beam at 410. For example, the second set of beams may include a set of children beams corresponding to the first beam (that is, a parent beam) determined at 410. In some examples, the second set of beams may be narrower than the determined first beam, and the determined first beam may encompass the area of the second set of beams.

At 415-a, if the measurement of the beam selection parameter for the beam A of the first set of beams is greater than the measurement of the beam selection parameter for the beam B of the first set of beams, the UE 115 may measure the beam selection parameter for each beam of a second set of beams corresponding to the beam A.

At 415-b, if the measurement of the beam selection parameter for the beam A of the first set of beams is worse than the measurement of the beam selection parameter for the beam B of the first set of beams, the UE 115 may measure the beam selection parameter for each beam of a second set of beams corresponding to the beam B.

At 420, the UE 115 may compare the measurement of the beam selection parameter for the determined first beam to the measurements of the beam selection parameter for the second set of beams (for example, children beams) corresponding to the determined first beam.

For example, at 420-a, based on determining to use the beam A of the first set of beams at 410 and measuring the beam selection parameter for each beam of the second set of beams corresponding to the beam A at 415-a, the UE 115 may compare the measured beam selection parameters for each beam of the second set of beams corresponding to the beam A to the beam selection parameter measured for the beam A at 405.

Additionally or alternatively, at 420-b, based on determining to use the beam B of the first set of beams at 410 and measuring the beam selection parameter for each beam of the second set of beams corresponding to the beam B at 415-b, the UE 115 may compare the measured beam selection parameters for each beam of the second set of beams corresponding to the beam B to the beam selection parameter measured for the beam B at 405.

At 425, if a measurement of the beam selection parameter for at least one of the beams of the second set of beams corresponding to the determined first beam is greater than the measurement of the beam selection parameter for the determined first beam, the UE 115 may continue the above beam selection procedure (for example, perform a subsequent power search) until a beam of sufficient narrowness has been found for communications with the base station 105. For example, the UE 115 may determine a third set of beams corresponding to a beam of the second set of beams (that is, a beam of the second set of beams that has a highest measurement of the beam selection procedure) to perform measurements of the beam selection procedure for each beam of the third set of beams to further refine a beam for communications with the base station 105.

At 425-a, the UE 115 may continue to refine the beam A with subsequent sets of narrower beams with subsequent power searches for each beam of the subsequent sets of narrower beams. Additionally or alternatively, at 425-b, the UE 115 may continue to refine the beam B with subsequent sets of narrower beams with subsequent power searches.

Additionally or alternatively, at 430, if none of the measurements of the beam selection parameter of the second set of beams (for example, children or child beams) corresponding to the determined first beam are greater than the measurement of the beam selection parameter for the determined first beam, the UE 115 may determine that a wrong first beam was chosen. Subsequently, the UE 115 may then choose (for example, select) a new parent beam (that is, first layer beam) to continue the beam selection procedure.

For example, at 430-a, the UE 115 may determine that the beam A is an incorrect choice for the beam selection procedure based on the second set of beams (for example, children beams) corresponding to the beam A having lower measurements of the beam selection parameter than the beam A, and the UE 115 may then choose a new beam to perform the beam selection procedure.

Additionally or alternatively, at 430-b, the UE 115 may determine that the beam B is an incorrect choice for the beam selection procedure based on the second set of beams (for example, children beams) corresponding to the beam B having lower measurements of the beam selection parameter than the beam B, and the UE 115 may then choose a new beam to perform the beam selection procedure. In some examples, the UE 115 may backtrack to 405 to select a new parent beam from the first set of beams based on measuring the beam selection parameter again for each beam of the first set of beams. Additionally or alternatively, the UE 115 may backtrack to selecting a different beam of the first set of beams based on the initial set of measurements and proceed to 415-a or 415-b to select the alternative of the beam A or the beam B.

At 435, the UE 115 may apply dithering to the determined first beam to avoid getting stuck in a local maxima. For example, without dithering, after determining the second set of beams of a selected beam are worse than the corresponding selected beam, the UE 115 may be stuck in a loop of continuing to select a same beam again and again for the beam selection procedure based on the measurement of the beam being more optimal than other beams in the same set of beams. In some examples, the dithering may include adding arbitrary noise to the initially determined first beam to add randomness and detune the determined first beam to adjust the beam pattern for the determined first beam (for example, aim the determined first beam in a different direction, thereby worsening the measurement of the beam selection parameter for the determined first beam).

In other examples, as part of dithering, the UE 115 may select from a range of pre-selected neighbor beams to the determined first beam and may purposefully select a suboptimal beam for continuing the beam selection procedure. For example, if the beam ID of the determined first beam is '0,' the neighbors of this determined first beam may have beam IDs of '2,' '3,' '4,' '5,' and '6.' For each beam ID, the dithering beam ID choice may be selected based on a beam characterization code book result. Thus, a UE 115 which originally selected beam '0' as the determined first beam may then select at random any of the neighbor beams of beam '0' during the backtracking or may select a specific neighboring beam that is sub-optimal (for example, having lower measurements of the beam selection parameter) than the beam '0.' In some examples, additional beam IDs that are not neighbor beams to determined first beam may be added to a candidate pool of possible beams to use for the beam selection procedure in order to decrease a likelihood of getting stuck in a wrong subbranch. These additional dithering beam IDs may be added to the candidate pool based on measurements of the beam selection parameter of a beam.

In some implementations, neighbor beams may be defined as beams that have a peak power pointing next to an original "host" peak angle (for example, beams of a same layer that with peak powers pointing next to a given beam). For example, all beam angles and radiation patterns may be pre-measured in a beam characterization test, in which all possible beam patterns are measured in all spherical angles for a wireless device. In some implementations, some radiation patterns for forming beams may include more than one peak (for example, a 'Y' shape) and other types of shapes, and the UE 115 may determine corresponding types of beams with these different shapes and different numbers of peaks as part of the beam characterization. The resulting characterization result may then be built into a codebook containing all beam IDs with respective information such as peak power angles for the wireless device.

Without the backtracking or dithering, the described beam selection algorithm may become stuck in a local maxima as all beams on a "wrong" branch may not receive a better measured beam selection parameter than a previously selected beam (for example, no child beams have a higher power than a parent beam). For example, a same parent beam that leads to a local maxima (for example, a same beam with a same maximum received power amongst each beam of a same layer) may be selected each time a beam selection procedure is performed.

This same parent beam may have a similar power measurement as one or more beams of a same layer but with at least a slightly higher power received from an additional wireless device (for example, a base station 105), so comparing this same parent beam to a different parent beam of the same layer (for example, a "correct" parent beam) may result in continuing to select the same parent beam even though the different parent beam may ultimately lead to a global maxima child beam (for example, a child beam that has a maximum power measurement among all possible beams possible) in a hierarchal branch of beams stemming off the different parent beam. If the described beam selection algorithm cannot escape from the wrong parent branches, the beam selection algorithm may be unable to find a true global maxima in the beam selection procedure (for example, beam search) and may become stuck with a sub-optimal beam. In some implementations, the applied noise from the dithering procedure may "wiggle" the selection of beams to get outside of a bad local maxima in order to get to the global maxima.

Figure 5:
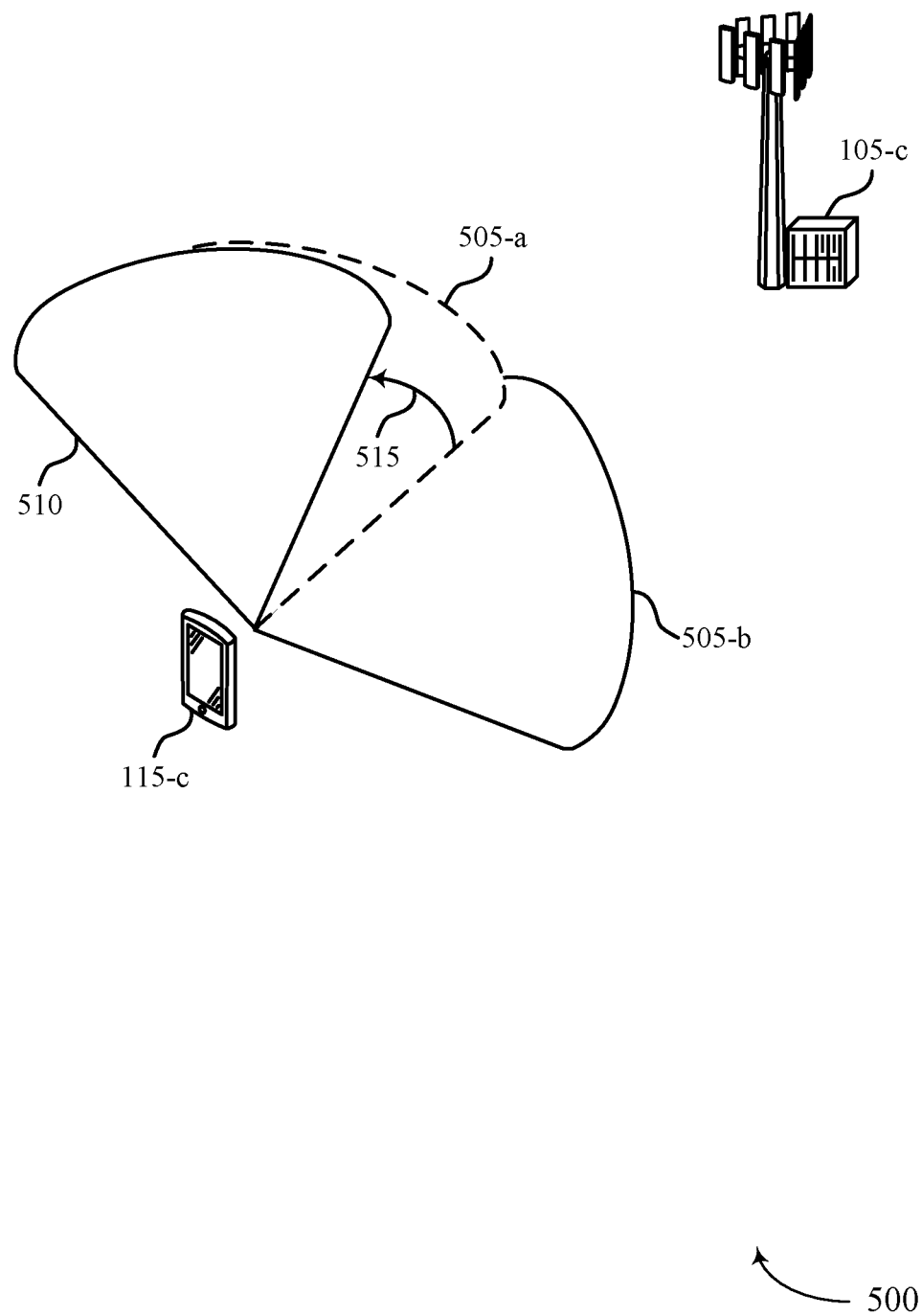
FIG. 5 illustrates an example of a dithering technique that supports beam management with backtracking and dithering in accordance with aspects of the present disclosure.

FIG. 5 illustrates an example of a dithering technique 500 that supports beam management with backtracking and dithering in accordance with aspects of the present disclosure. The dithering technique 500 may be implemented by or may implement aspects of wireless communications systems 100 and 200. For example, the dithering technique 500 may include a UE 115-c and a base station 105-c, which may represent examples of corresponding UEs 115 and base stations 105, respectively, as described with reference to FIGS. 1-4. Additionally, the UE 115-c may implement a beam selection algorithm described with reference to FIGS. 2-4.

As a first operation of a beam selection procedure, the UE 115-c may determine a first set of beams that includes a first beam 505-a and a second beam 505-b as described with reference to FIGS. 2-4. For example, the first beam 505-a and the second beam 505-b may represent examples of a set of parent beams (for example, first layer beams) from which the UE 115-c selects for performing a beam selection procedure. Subsequently, the UE 115-c may initially select the first beam 505-a based on a measurement of a beam selection parameter for the first beam 505-a being more optimal than a measurement of the beam selection parameter for the second beam 505-b.

If measuring the beam selection parameter for a second set of beams (for example, children or child beams) corresponding to the first beam 505-a during a next operation of the beam selection procedure, however, the UE 115-c may determine that the measurement of the beam selection parameter for each beam of the second set of beams is lower than the measurement of the beam selection parameter for the first beam 505-a. Accordingly, as described with reference to FIGS. 2-4, the UE 115-c may then backtrack to select a different beam of the first set of beams to continue the beam selection procedure.

As noted with reference to FIG. 4, the UE 115-c may incorrectly select the first beam 505-a again if the measurement of the beam selection parameter for the first beam 505-a continues to be more optimal than the measurement of the beam selection parameter for the second beam 505-b. To prevent the UE 115-c from incorrectly selecting and staying in this "local maxima" of selecting the same beam for the beam selection procedure, the UE 115-c may use aspects related to the dithering technique 500 to determine a detuned beam 510 that corresponds to the first beam 505-a. For example, the detuned beam 510 may be an example of the first beam 505-a that has been detuned by a detuning process 515.

The detuning process 515 may include applying a supplementary signal or different aspect to the first beam 505-a to generate the detuned beam 510. Accordingly, the detuned beam 510 may have a different beam pattern than the first beam 505-a based on the dithering and detuning process 515. In some examples, based on applying the different beam pattern to the first beam 505-a, the detuned beam 510 may be misdirected or pointed in a different direction to aim away from the base station 105-c. For example, as part of dithering and the detuning process 515, the UE 115-c may add or apply random noise to phases of antenna array elements that produced the first beam 505-a to generate the detuned beam 510. Because the detuned beam 510 no longer points as readily towards the base station 105-c based on the dithering, the UE 115-c may be less likely to choose the detuned beam 510 for the beam selection procedure after determining the first beam 505-a is a wrong beam based on the detuned beam 510 having a lower measurement of the beam selection parameter than originally measured for the first beam 505-a.

Figure 6A:
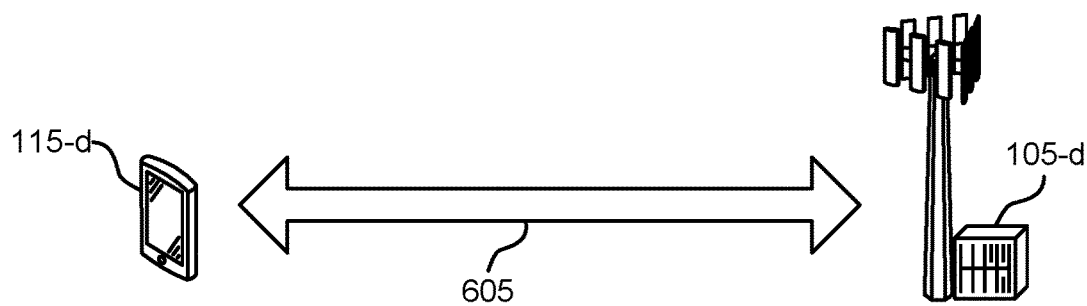
FIGS. 6A and 6B illustrate examples of communications paths that supports beam management with backtracking and dithering in accordance with aspects of the present disclosure.
Figure 6B:
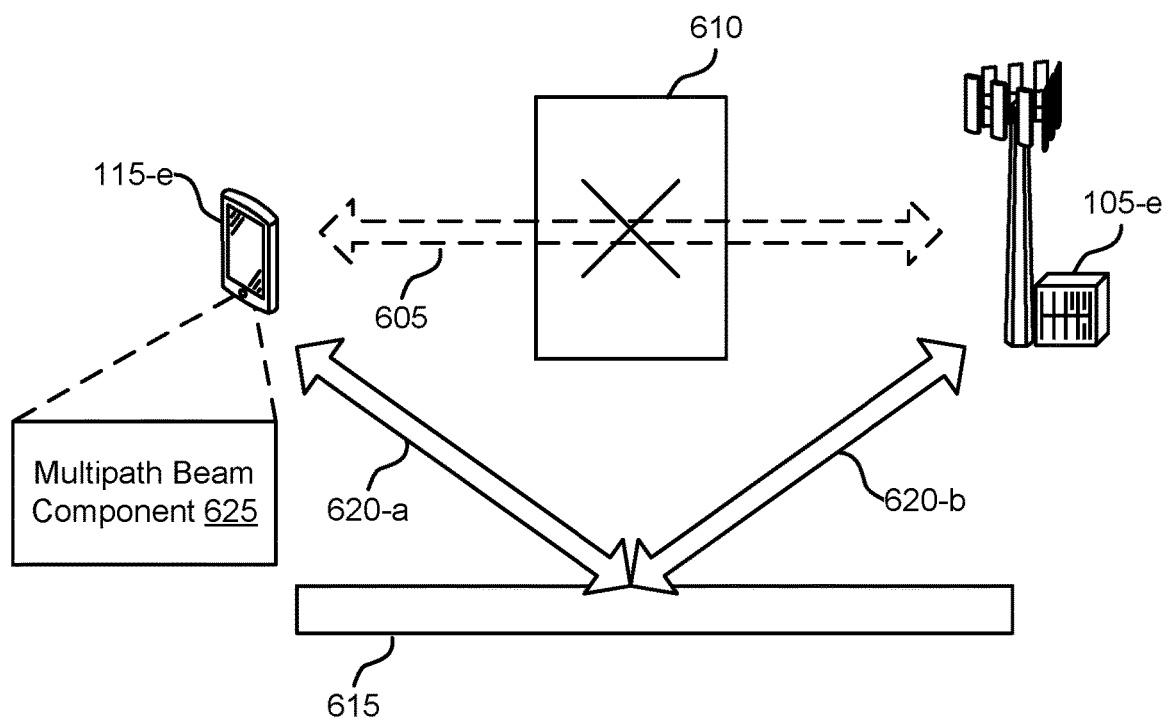

FIGS. 6A and 6B illustrate examples of communications paths 600 and 601, respectively, that support beam management with backtracking and dithering in accordance with aspects of the present disclosure. The communications paths 600 and 601 may be implemented by or may implement aspects of the wireless communications systems 100 and 200. For example, the communications path 600 may include a UE 115-d and a base station 105-d, which may represent examples of corresponding UEs 115 and base stations 105, respectively, as described with reference to FIGS. 1-5. Additionally, the communications path 601 may include a UE 115-e and a base station 105-e, which may also represent examples of corresponding UEs 115 and base stations 105, respectively, as described with reference to FIGS. 1-5.

The communications path 600 may illustrate an example of a line-of-sight (LOS) communications path between the UE 115-d and the base station 105-d. The line of sight (LOS) communications path may include that the communications between the UE 115-d and the base station 105-d are direct and not reflecting off additional mediums. For example, the UE 115-d and the base station 105-d may communicate via a single path 605 (for example, using respective beams at each device). Additionally, the UE 115-d may use a beam selection algorithm as described with reference to FIGS. 2-5 to identify a strongest path (for example, a most optimal beam) for the communications with the base station 105-d. For example, the single path 605 may represent a single narrow and high directivity beam for the LOS path at the UE 115-d perspective.

Additionally or alternatively, communications path 601 may illustrate an example of communications occurring between the UE 115-e and the base station 105-e via a multipath. For example, the single path 605 (for example, LOS path) as described in FIG. 6A may be blocked or hindered by an obstruction 610 (for example, beamformed transmissions may be susceptible to blockage from physical obstructions that prevent the beamformed transmissions from passing through). Subsequently, the UE 115-c and the base station 105-c may communicate via a multipath that consists of multiple reflections 620 of the beamformed transmissions, such as a first reflection 620-a and a second reflection 620-b that reflect off a surface 615.

In such examples with the direct path (that is, the LOS path) being blocked, the UE 115-e may determine to enter a multipath mode to receive multiple paths of signals with similar strength based on if there are multiple directional beams that have similar signal strengths. In this multipath mode, the UE 115-e may determine that lower level, less narrow beams or beams pointing in directions away from the base station 105-e may be better than narrow, high directivity beams pointing at the base station 105-e. In some examples, the UE 115-e may accept different children beams of multiple different parent beams. Additionally, the UE 115-e may select different candidate pools of beams for a beam selection procedure once the multipath condition is detected (for example, as opposed to candidate pools of beams for the single path 605, direct path, or LOS path). For example, with multipath cases, the UE 115-e may use a different beam selection procedure that includes on-call machine learning characterization and off-call UE beam characterization in different multipath conditions or different simulated channel modeling.

In some implementations, the UE 115-e may include a multipath beam component 625 to perform an optimized beam search for multipath scenarios (that is, no LOS path) using machine learning for on the fly updates during online operation and using simulation and UE characterization (for example but not limited to, cases where a phantom hand is holding the device in different ways). For example, the multipath beam component 625 may communicate with different components and a processor within the UE 115-e to identify beams for use in multipath scenarios and may store the optimal multipath beams within the UE 115-e (for example, in memory on the UE 115-e).

Figure 7:
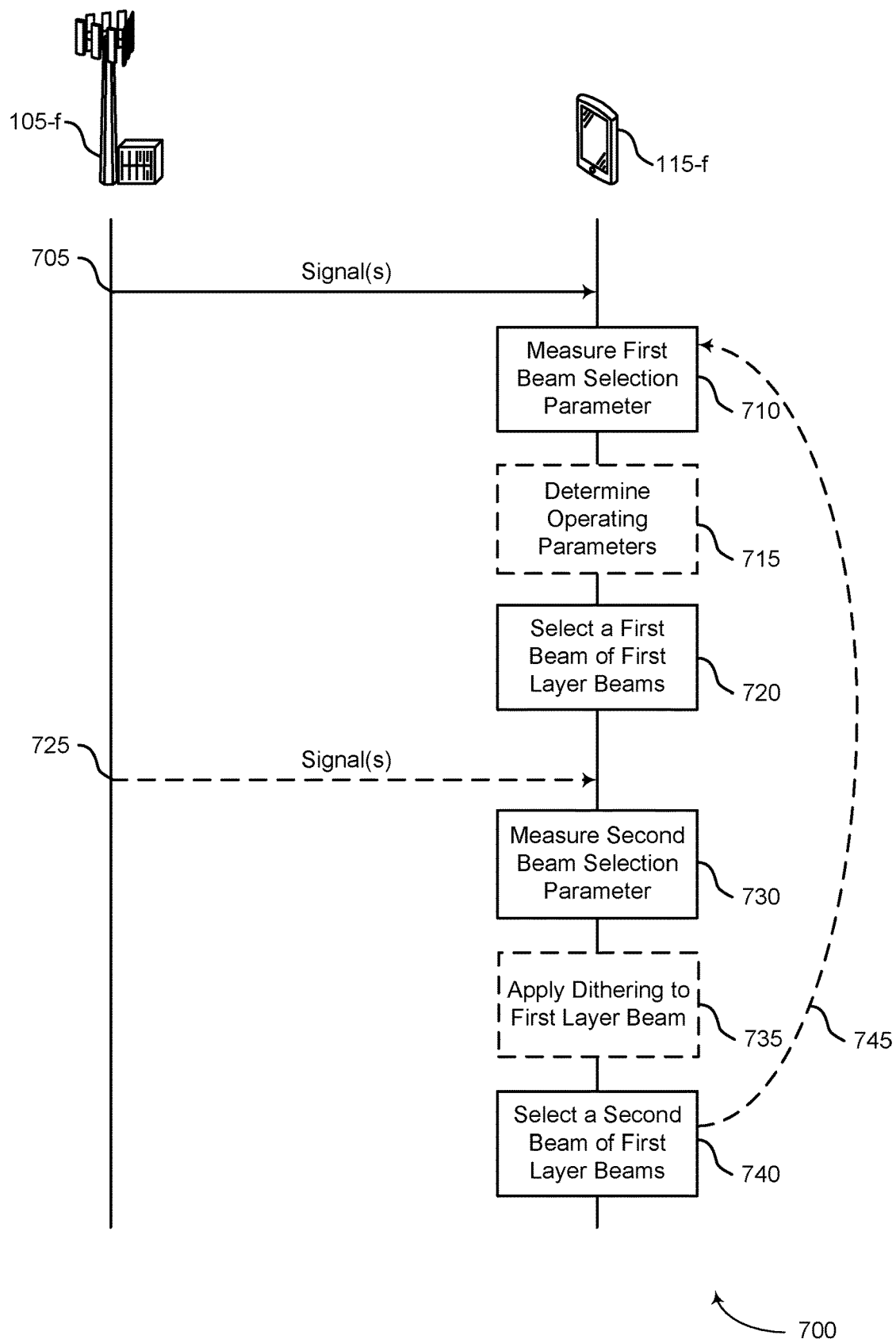
FIG. 7 illustrates an example of a process flow that supports beam management with backtracking and dithering in accordance with aspects of the present disclosure.

FIG. 7 illustrates an example of a process flow 700 that supports beam management with backtracking and dithering in accordance with aspects of the present disclosure. In some examples, the process flow 700 may be implemented by or may implement aspects of wireless communications systems 100 and 200. For example, the process flow 700 may include a base station 105-f and a UE 115-f, which may represent examples of corresponding base stations 105 and UEs 115, respectively, as described above with reference to FIGS. 1-6B.

In the following description of the process flow 700, the operations between the UE 115-f and the base station 105-f may be transmitted in a different order than the exemplary order shown, or the operations performed by the UE 115-f and the base station 105-f may be performed in different orders or at different times. Certain operations may also be left out of the process flow 700, or other operations may be added to the process flow 700. It is to be understood that while the UE 115-f and the base station 105-f are shown performing a number of the operations of the process flow 700, any wireless device may perform the operations shown. For example, the base station 105-f may similarly perform the operations shown in the process flow 700 as part of a beam search or a beam selection procedure.

At 705, the UE 115-f may receive, from a wireless device (for example, the base station 105-f), one or more signals on each beam of a set of first layer beams. In some examples, the UE 115-f may determine the set of the first layer beams for performing the beam selection procedure.

At 710, the UE 115-f may measure, as part of a beam selection procedure for communicating with the wireless device, one or more first beam selection parameters for the one or more signals, the one or more first beam selection parameters measured for, in some examples, each beam of the set of first layer beams.

At 715, the UE 115-f may determine that an operability condition for one or more technology operations of the UE 115-f based on measurements of how the one or more technology operations are affected by beamforming communications in a same time slot, in which selecting a first beam of the set of the first layer beams, a second beam of the set of the first layer beams, or both is based on determining the operability condition. In some examples, the one or more technology operations may include one or more of operations using a different radio access technology (for example, LTE communications) than a radio access technology used for the communicating with the wireless device, operations using GPS, or operations using Wi-Fi protocols, among other examples.

Additionally or alternatively, the UE 115-*f* may determine a battery charge level of the UE 115-*f*, in which selecting a first beam of the set of the first layer beams, a second beam of the set of the first layer beams, or both is based on the battery charge level of the UE 115-*f*. In some examples, the UE 115-*f* may determine a latency and link reliability condition for the communicating with the wireless device, in which selecting the first beam of the set of the first layer beams, the second beam of the set of the first layer beams, or both is based on determining the latency and link reliability condition for the communicating with the wireless device.

At 720, the UE 115-*f* may select a first beam of the set of the first layer beams based on the measuring. For example, the UE 115-*f* may select the first beam based on a measurement of the first beam selection parameter being higher (for example, more optimal) for the first beam compared to measurements of the first beam selection parameter of other beams in the set of the first layer beams. At 725, the UE 115-*f* may receive, a second set of signals from the wireless device on one or more beams of a set of second layer beams associated with the first beam.

At 730, the UE 115-*f* may measure a second beam selection parameter for each beam of the set of second layer beams associated with the first beam based on selecting the first beam. Subsequently, in some examples, the UE 115-*f* may determine that selection of the first beam of the set of the first layer beams for the beam selection procedure results in one or more subsequent beams not suitable for the communicating with the wireless device based on a set of measurements of the second beam selection parameter for respective beams of the set of the second layer beams associated with the first beam being worse (for example, less) than a first measurement of the first beam selection parameter for the first beam. In some examples, the set of the first layer beams may include a set of L1 beams, and the set of the second layer beams may include a set of L2 beams corresponding to a L1 beam of the set of L1 beams. Additionally, the first beam selection parameter, the second beam selection parameter, or both may include a received signal power measurement.

In some examples, the set of the first layer beams, the set of the second layer beams, or both may include LOS beams. Additionally or alternatively, the set of the first layer beams, the set of the second layer beams, or both may include multipath beams. For example, the UE 115-*f* may determine the set of the first layer beams, the set of the second layer beams, or both based on the set of the first layer beams, the set of the second layer beams, or both being multipath beams, in which the measuring the first beam selection parameter and the measuring the second beam selection parameter are based on determining the set of the first layer beams, the set of the second layer beams, or both for performing the beam selection procedure.

In some examples, the UE 115-*f* may determine that the set of the first layer beams, the set of the second layer beams, or both are the multipath beams based on sensing multiple directional beams with signal measurements that fall within a range of each other for the multiple directional beams. Additionally, the set of the first layer beams, the set of the second layer beams, or both may be determined based on one or more of a machine learning procedure or a beam characterization procedure for different multipath conditions or simulated channel models.

At 735, the UE 115-*f* may adjust the first beam of the set of the first layer beams by applying an arbitrary signal to add noise to signals received via the first beam (for example, dithering) based on measuring the first beam selection parameter and measuring the second beam selection parameter, in which the second beam of the set of the first layer beams is selected based on adjusting the first beam. In some examples, the adjusting of the first beam of the set of the first layer beams may include a change of a beam pattern for the first beam (for example, resulting in the first beam pointing in a different direction, having a different shape, or another effect on the first beam).

At 740, the UE 115-*f* may select a second beam of the set of first layer beams based on measuring the first beam selection parameter and measuring the second beam selection parameter (for example, backtracking to the second beam of the set of first layer beams). For example, the UE 115-*f* may select the second beam of the set of the first layer beams based on a comparison of a set of measurements of the second beam selection parameter for respective beams of the set of second layer beams associated with the first beam to a first measurement of the first beam selection parameter for the first beam of the set of the first layer beams. In some examples, the UE 115-*f* may select the second beam of the set of the first layer beams based on the set of measurements of the second beam selection parameter for each beam of the set of second layer beams being worse (for example, less) than the first measurement of the first beam selection parameter for the first beam. Additionally or alternatively, the UE 115-*f* may select the second beam of the set of the first layer beams from a range of beam IDs selected for the beam selection procedure, in which the selecting of the second beam is based on the second beam pointing in a different direction than the first beam (for example, dithering).

In some examples, after backtracking and selecting the second beam of the set of first layer beams, the UE 115-*f* may measure a third beam selection parameter for each beam of a set of second layer beams associated with the second beam based on selecting the second beam. Subsequently, the UE 115-*f* may select a beam of the set of the second layer beams associated with the second beam based on measuring the first beam selection parameter and measuring the third beam selection parameter. For example, the UE 115-*f* may select the beam of the set of the second layer beams associated with the second beam based on a first comparison of a first measurement of the first beam selection parameter for the second beam of the set of first layer beams to a set of measurements of the third beam selection parameter for respective beams of the set of second layer beams associated with the second beam and based on a second comparison of respective measurements of the set of measurements of the third beam selection parameter for each beam of the set of the second layer beams associated with the second beam. In some examples, the selecting the beam of the set of the second layer beams associated with the second beam is based on the measurement of the third beam selection parameter for the beam of the set of the second layer beams associated with the second beam being more optimal (for example, higher) than the first measurement of the first beam selection parameter for the second beam and based on the measurement of the third beam selection parameter for the beam being a most optimal (for example, highest) value for the set of the second layer beams associated with the second beam.

At 745, the UE 115-*f* may perform the operations of the process flow 700 iteratively or recursively to determine an optimal beam for communications with the base station 105-*f*. For example, the beam selection procedure may occur continuously with a very short time gap and with a hysteresis limit (for example, two (2) dB better than a previously selected or current beam), in which a beam with a beam selection measurement beyond the hysteresis limit may result in a new beam being picked if found. That is, the UE 115-*f* may perform the beam selection procedure continuously and may select different beams when measurements of the beam selection parameter for a child beam or for a different beam are sufficiently better than measurements of the beam selection parameter for a corresponding parent beam or previously selected beam.

Figure 8:
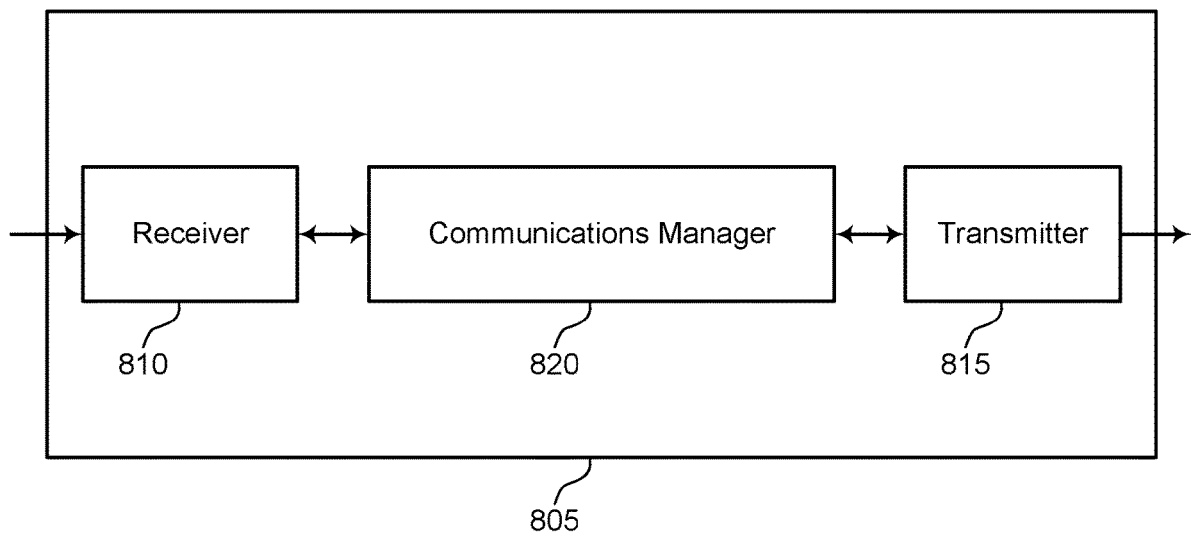
FIGS. 8 and 9 show block diagrams of devices that support beam management with backtracking and dithering in accordance with aspects of the present disclosure.

FIG. 8 shows a block diagram of a device 805 that supports beam management with backtracking and dithering in accordance with aspects of the present disclosure. The device 805 may be an example of aspects of a UE 115 or a base station 105 as described herein (for example, a first wireless device). The device 805 may include a receiver 810, a transmitter 815, and a communications manager 820. The communications manager 820 can be implemented, at least in part, by one or both of a modem and a processor. Each of these components may be in communication with one another (for example, via one or more buses).

The receiver 810 may provide a means for receiving information such as packets, user data, control information, or any combination thereof associated with various information channels (for example, control channels, data channels, information channels related to beam management with backtracking and dithering). Information may be passed on to other components of the device 805. The receiver 810 may utilize a single antenna or a set of multiple antennas.

The transmitter 815 may provide a means for transmitting signals generated by other components of the device 805. For example, the transmitter 815 may transmit information such as packets, user data, control information, or any combination thereof associated with various information channels (for example, control channels, data channels, information channels related to size-based neural network selection for autoencoder-based communication). In some examples, the transmitter 815 may be co-located with a receiver 810 in a transceiver component. The transmitter 815 may utilize a single antenna or a set of multiple antennas.

The communications manager 820, the receiver 810, the transmitter 815, or various combinations thereof or various components thereof may be examples of means for performing various aspects of beam management with backtracking and dithering as described herein. For example, the communications manager 820, the receiver 810, the transmitter 815, or various combinations or components thereof may support a method for performing one or more of the functions described herein.

In some examples, the communications manager 820, the receiver 810, the transmitter 815, or various combinations or components thereof may be implemented in hardware (for example, in communications management circuitry). The hardware may include a processor, a digital signal processor (DSP), an application-specific integrated circuit (ASIC), a field-programmable gate array (FPGA) or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (for example, by executing, by the processor, instructions stored in the memory).

Additionally or alternatively, in some examples, the communications manager 820, the receiver 810, the transmitter 815, or various combinations or components thereof may be implemented in code (for example, as communications management software or firmware) executed by a processor. If implemented in code executed by a processor, the functions of the communications manager 820, the receiver 810, the transmitter 815, or various combinations or components thereof may be performed by a general-purpose processor, a DSP, a central processing unit (CPU), an ASIC, an FPGA, or any combination of these or other programmable logic devices (for example, configured as or otherwise supporting a means for performing the functions described in the present disclosure).

In some examples, the communications manager 820 may be configured to perform various operations (for example, receiving, monitoring, transmitting) using or otherwise in cooperation with the receiver 810, the transmitter 815, or both. For example, the communications manager 820 may receive information from the receiver 810, send information to the transmitter 815, or be integrated in combination with the receiver 810, the transmitter 815, or both to receive information, transmit information, or perform various other operations as described herein.

The communications manager 820 may support wireless communications at a first wireless device in accordance with examples as disclosed herein. For example, the communications manager 820 may be configured as or otherwise support a means for receiving, from a second wireless device, one or more signals on each beam of a set of multiple first layer beams. The communications manager 820 may be configured as or otherwise support a means for measuring, as part of a beam selection procedure for communicating with the second wireless device, a first beam selection parameter for the one or more signals, the first beam selection parameter measured for each beam of the set of multiple first layer beams. The communications manager 820 may be configured as or otherwise support a means for selecting a first beam of the set of multiple the first layer beams based on the measuring. The communications manager 820 may be configured as or otherwise support a means for measuring a second beam selection parameter for each beam of a set of multiple second layer beams associated with the first beam based on selecting the first beam. The communications manager 820 may be configured as or otherwise support a means for selecting a second beam of the set of multiple first layer beams based on measuring the first beam selection parameter and measuring the second beam selection parameter.

By including or configuring the communications manager 820 in accordance with examples as described herein, the device 805 (for example, a processor controlling or otherwise coupled to the receiver 810, the transmitter 815, the communications manager 820, or a combination thereof) may support techniques for more efficient utilization of communication resources. For example, based on reverting back to select a different beam based on measurements of a beam selection parameter, the device 805 may determine an optimal beam for communications with another wireless device.

Figure 9:
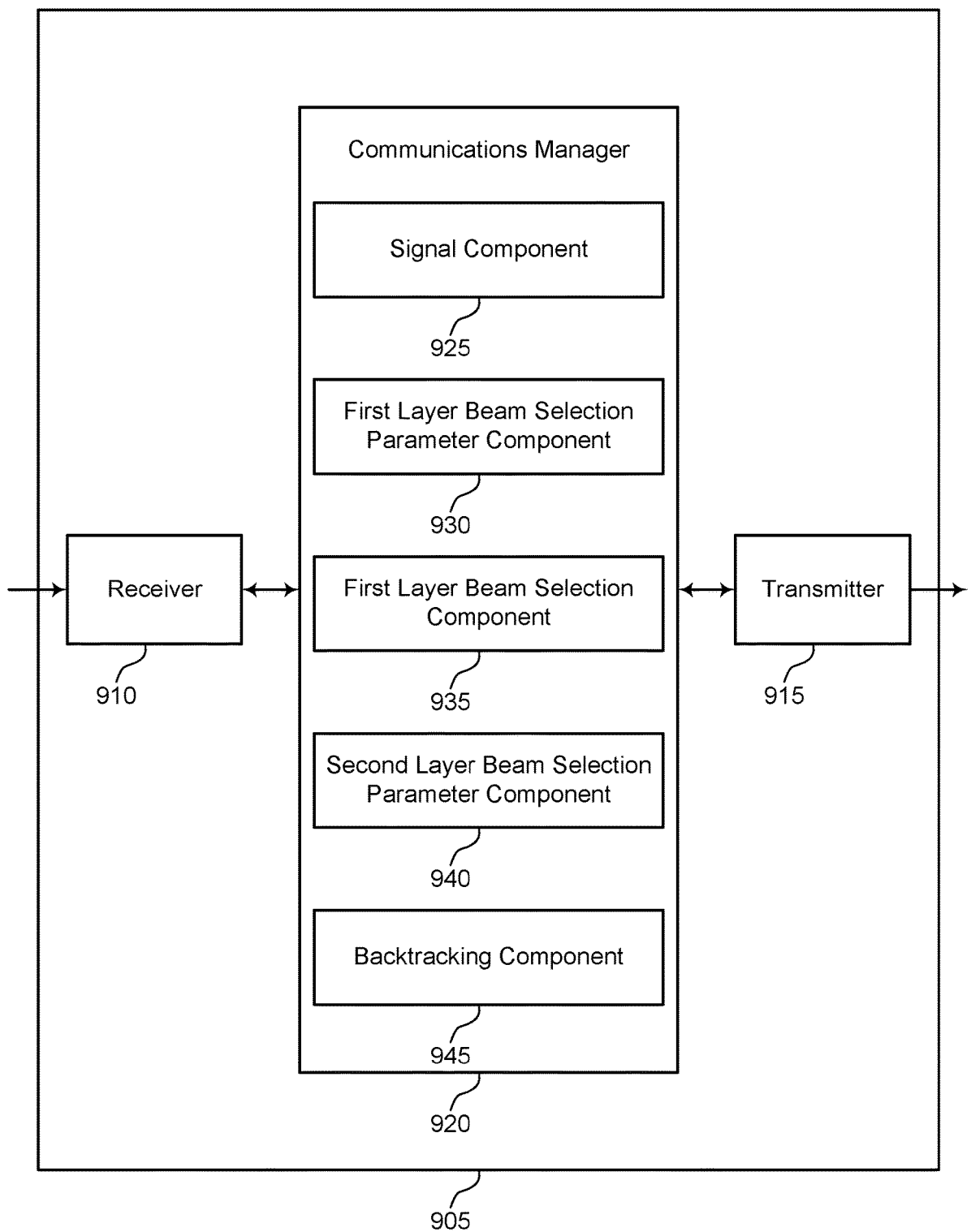

FIG. 9 shows a block diagram of a device 905 that supports beam management with backtracking and dithering in accordance with aspects of the present disclosure. The device 905 may be an example of aspects of a device 805 or a UE 115 or a base station 105 as described herein (for example, a first wireless device). The device 905 may include a receiver 910, a transmitter 915, and a communications manager 920. The device 905 can be implemented, at least in part, by one or both of a modem and a processor. Each of these components may be in communication with one another (for example, via one or more buses).

The receiver 910 may provide a means for receiving information such as packets, user data, control information, or any combination thereof associated with various information channels (for example, control channels, data channels, information channels related to beam management with backtracking and dithering). Information may be passed on to other components of the device 905. The receiver 910 may utilize a single antenna or a set of multiple antennas.

The transmitter 915 may provide a means for transmitting signals generated by other components of the device 905. For example, the transmitter 915 may transmit information such as packets, user data, control information, or any combination thereof associated with various information channels (for example, control channels, data channels, information channels related to size-based neural network selection for autoencoder-based communication). In some examples, the transmitter 915 may be co-located with a receiver 910 in a transceiver component. The transmitter 915 may utilize a single antenna or a set of multiple antennas.

The device 905, or various components thereof, may be an example of means for performing various aspects of beam management with backtracking and dithering as described herein. For example, the communications manager 920 may include a signal component 925, a first layer beam selection parameter component 930, a first layer beam selection component 935, a second layer beam selection parameter component 940, a backtracking component 945, or any combination thereof. The communications manager 920 may be an example of aspects of a communications manager 820 as described herein. In some examples, the communications manager 920, or various components thereof, may be configured to perform various operations (for example, receiving, monitoring, transmitting) using or otherwise in cooperation with the receiver 910, the transmitter 915, or both. For example, the communications manager 920 may receive information from the receiver 910, send information to the transmitter 915, or be integrated in combination with the receiver 910, the transmitter 915, or both to receive information, transmit information, or perform various other operations as described herein.

The communications manager 920 may support wireless communications at a first wireless device in accordance with examples as disclosed herein. The signal component 925 may be configured as or otherwise support a means for receiving, from a second wireless device, one or more signals on each beam of a set of multiple first layer beams. The first layer beam selection parameter component 930 may be configured as or otherwise support a means for measuring, as part of a beam selection procedure for communicating with the second wireless device, a first beam selection parameter for the one or more signals, the first beam selection parameter measured for each beam of the set of multiple first layer beams. The first layer beam selection component 935 may be configured as or otherwise support a means for selecting a first beam of the set of multiple the first layer beams based on the measuring. The second layer beam selection parameter component 940 may be configured as or otherwise support a means for measuring a second beam selection parameter for each beam of a set of multiple second layer beams associated with the first beam based on selecting the first beam. The backtracking component 945 may be configured as or otherwise support a means for selecting a second beam of the set of multiple first layer beams based on measuring the first beam selection parameter and measuring the second beam selection parameter.

Figure 10:
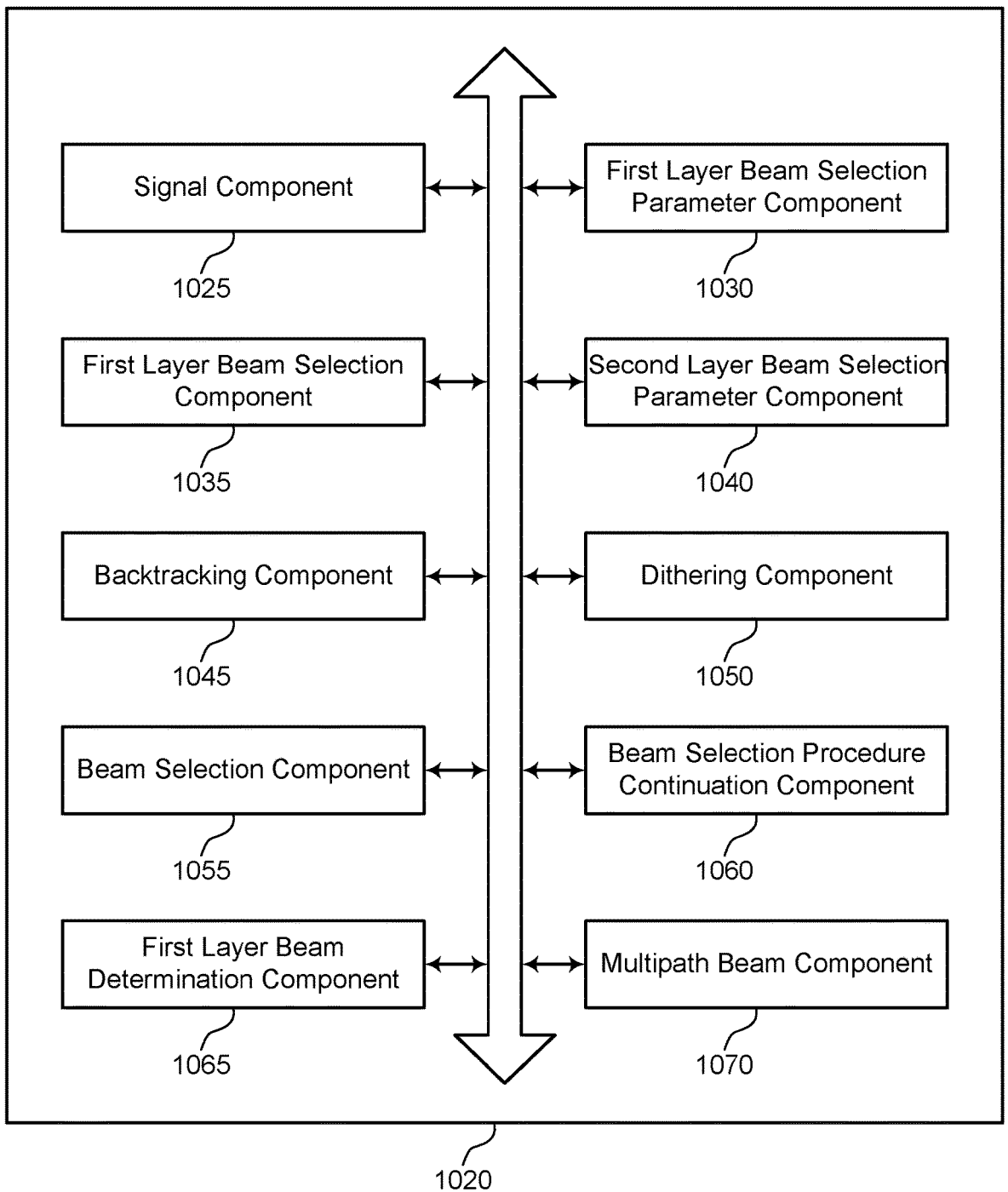
FIG. 10 shows a block diagram of a communications manager that supports beam management with backtracking and dithering in accordance with aspects of the present disclosure.

FIG. 10 shows a block diagram of a communications manager 1020 that supports beam management with backtracking and dithering in accordance with aspects of the present disclosure. The communications manager 1020 may be an example of aspects of a communications manager 820, a communications manager 920, or both, as described herein. The communications manager 1020, or various components thereof, may be an example of means for performing various aspects of beam management with backtracking and dithering as described herein. For example, the communications manager 1020 may include a signal component 1025, a first layer beam selection parameter component 1030, a first layer beam selection component 1035, a second layer beam selection parameter component 1040, a backtracking component 1045, a dithering component 1050, a beam selection component 1055, a beam selection procedure continuation component 1060, a first layer beam determination component 1065, a multipath beam component 1070, or any combination thereof. Each of these components may communicate, directly or indirectly, with one another (for example, via one or more buses).

The communications manager 1020 may support wireless communications at a first wireless device in accordance with examples as disclosed herein. The signal component 1025 may be configured as or otherwise support a means for receiving, from a second wireless device, one or more signals on each beam of a set of multiple first layer beams. The first layer beam selection parameter component 1030 may be configured as or otherwise support a means for measuring, as part of a beam selection procedure for communicating with the second wireless device, a first beam selection parameter for the one or more signals, the first beam selection parameter measured for each beam of the set of multiple first layer beams. The first layer beam selection component 1035 may be configured as or otherwise support a means for selecting a first beam of the set of multiple the first layer beams based on the measuring. The second layer beam selection parameter component 1040 may be configured as or otherwise support a means for measuring a second beam selection parameter for each beam of a set of multiple second layer beams associated with the first beam based on selecting the first beam. The backtracking component 1045 may be configured as or otherwise support a means for selecting a second beam of the set of multiple first layer beams based on measuring the first beam selection parameter and measuring the second beam selection parameter.

In some examples, to support selecting the second beam of the set of multiple first layer beams, the backtracking component 1045 may be configured as or otherwise support a means for selecting the second beam of the set of multiple the first layer beams based on a comparison of a set of multiple measurements of the second beam selection parameter for respective beams of the set of multiple second layer beams associated with the first beam to a first measurement of the first beam selection parameter for the first beam of the set of multiple the first layer beams.

In some examples, the selecting the second beam of the set of multiple the first layer beams is based on the set of multiple measurements of the second beam selection parameter for each beam of the set of multiple second layer beams being worse (for example, less) than the first measurement of the first beam selection parameter for the first beam.

In some examples, to support selecting the second beam of the set of multiple first layer beams, the dithering component 1050 may be configured as or otherwise support a means for selecting the second beam of the set of multiple the first layer beams from a range of beam identifiers selected for the beam selection procedure, the selecting of the second beam based on the second beam pointing in a different direction than the first beam.

In some examples, the dithering component 1050 may be configured as or otherwise support a means for adjusting the first beam of the set of multiple the first layer beams by applying an arbitrary signal to add noise to signals received via the first beam based on measuring the first beam selection parameter and measuring the second beam selection parameter, in which the second beam of the set of multiple the first layer beams is selected based on adjusting the first beam.

In some examples, the adjusting of the first beam of the set of multiple the first layer beams includes a change of a beam pattern for the first beam.

In some examples, the beam selection component 1055 may be configured as or otherwise support a means for determining an operability condition for one or more technology operations of the first wireless device based on measurements of how the one or more technology operations are affected by beamforming communications in a same time slot, in which selecting the first beam of the set of multiple the first layer beams, the second beam of the set of multiple the first layer beams, or both is based on determining the operability condition.

In some examples, the one or more technology operations include one or more of operations using a different radio access technology than a radio access technology used for the communicating with the second wireless device, operations using a global positioning system, or operations using wireless fidelity protocols.

In some examples, the beam selection component 1055 may be configured as or otherwise support a means for determining a battery charge level of the first wireless device, in which selecting the first beam of the set of multiple the first layer beams, the second beam of the set of multiple the first layer beams, or both is based on the battery charge level of the first wireless device.

In some examples, the beam selection component 1055 may be configured as or otherwise support a means for determining a latency and link reliability condition for the communicating with the second wireless device, in which selecting the first beam of the set of multiple the first layer beams, the second beam of the set of multiple the first layer beams, or both is based on determining the latency and link reliability condition for the communicating with the second wireless device.

In some examples, the beam selection procedure continuation component 1060 may be configured as or otherwise support a means for measuring a third beam selection parameter for each beam of a set of multiple second layer beams associated with the second beam based on selecting the second beam. In some examples, the beam selection procedure continuation component 1060 may be configured as or otherwise support a means for selecting a beam of the set of multiple the second layer beams associated with the second beam based on measuring the first beam selection parameter and measuring the third beam selection parameter.

In some examples, the beam selection procedure continuation component 1060 may be configured as or otherwise support a means for selecting the beam of the set of multiple the second layer beams associated with the second beam based on a first comparison of a first measurement of the first beam selection parameter for the second beam of the set of multiple first layer beams to a set of multiple measurements of the third beam selection parameter for respective beams of the set of multiple second layer beams associated with the second beam and based on a second comparison of respective measurements of the set of multiple measurements of the third beam selection parameter for each beam of the set of multiple the second layer beams associated with the second beam.

In some examples, the selecting the beam of the set of the second layer beams associated with the second beam is based on the measurement of the third beam selection parameter for the beam of the set of the second layer beams associated with the second beam being more optimal (for example, higher) than the first measurement of the first beam selection parameter for the second beam and based on the measurement of the third beam selection parameter for the beam being a most optimal (for example, highest value) for the set of the second layer beams associated with the second beam.

In some examples, the backtracking component 1045 may be configured as or otherwise support a means for determining that selection of the first beam of the set of multiple the first layer beams for the beam selection procedure results in one or more subsequent beams not suitable for the communicating with the second wireless device based on a set of multiple measurements of the second beam selection parameter for respective beams of the set of multiple the second layer beams associated with the first beam being less than a first measurement of the first beam selection parameter for the first beam.

In some examples, the first layer beam determination component 1065 may be configured as or otherwise support a means for determining the set of multiple the first layer beams for performing the beam selection procedure, in which the measuring the first beam selection parameter is based on determining the set of multiple the first layer beams for performing the beam selection procedure.

In some examples, the set of multiple the first layer beams include a set of multiple layer one beams, and the set of multiple the second layer beams include a set of multiple layer two beams corresponding to a layer one beam of the set of multiple layer one beams.

In some examples, the set of multiple the first layer beams, the set of multiple the second layer beams, or both include line-of-sight beams.

In some examples, the set of multiple the first layer beams, and the multipath beam component 1070 may be configured as or otherwise support a means for determining the set of multiple the first layer beams, the set of multiple the second layer beams, or both based on the set of multiple the first layer beams, the set of multiple the second layer beams, or both including multipath beams, in which the measuring the first beam selection parameter and the measuring the second beam selection parameter are based on determining the set of multiple the first layer beams, the set of multiple the second layer beams, or both for performing the beam selection procedure.

In some examples, the multipath beam component 1070 may be configured as or otherwise support a means for determining the set of multiple the first layer beams, the set of multiple the second layer beams, or both include the multipath beams based on sensing multiple directional beams with signal measurements that fall within a range of each other for the multiple directional beams.

In some examples, the set of multiple the first layer beams, the set of multiple the second layer beams, or both are determined based on one or more of a machine learning procedure or a beam characterization procedure for different multipath conditions or simulated channel models. For example, the multipath beam component 1070 may communicate with a processor of the device 1005 to perform machine learning for determining optimal beams of a multipath beam on the fly for communications with the second wireless device, as well as performing the beam characterization procedure in a more static manner for offline determinations of optimal beams for communications with the second wireless device in a multipath scenario.

In some examples, the first beam selection parameter, the second beam selection parameter, or both include a received signal power measurement.

Figure 11:
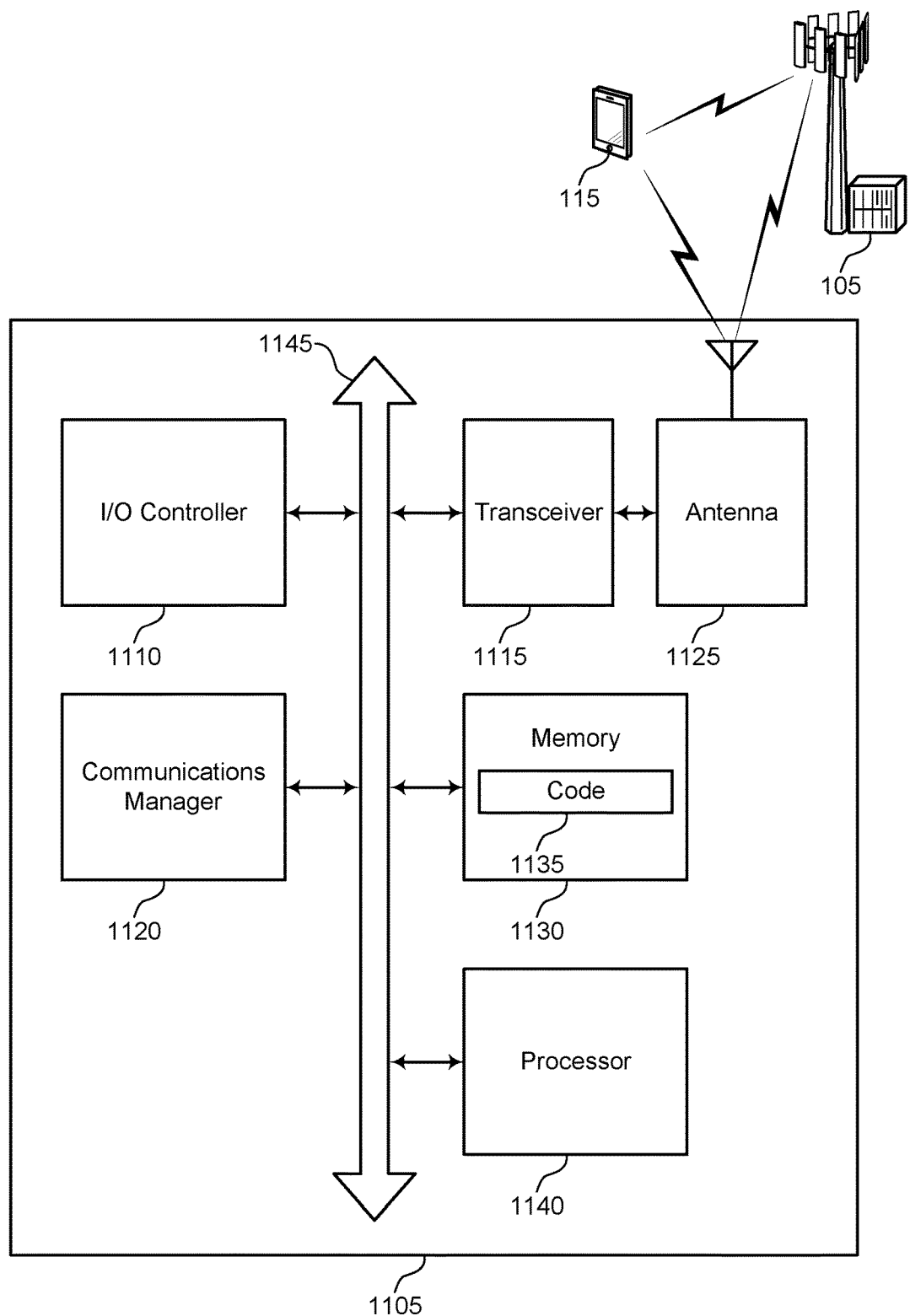
FIG. 11 shows a diagram of a system including a device that supports beam management with backtracking and dithering in accordance with aspects of the present disclosure.

FIG. 11 shows a diagram of a system including a device 1105 that supports beam management with backtracking and dithering in accordance with aspects of the present disclosure. The device 1105 may be an example of or include the components of a device 805, a device 905, or a UE 115 as described herein (for example, a first wireless device). The device 1105 may communicate wirelessly with one or more base stations 105, UEs 115, or any combination thereof. The device 1105 may include components for bi-directional voice and data communications including components for transmitting and receiving communications, such as a communications manager 1120, an I/O controller 1110, a transceiver 1115, an antenna 1125, a memory 1130, code 1135, and a processor 1140. These components may be in electronic communication or otherwise coupled (for example, operatively, communicatively, functionally, electronically, electrically) via one or more buses (for example, a bus 1145).

The I/O controller 1110 may manage input and output signals for the device 1105. The I/O controller 1110 may also manage peripherals not integrated into the device 1105. In some cases, the I/O controller 1110 may represent a physical connection or port to an external peripheral. In some cases, the I/O controller 1110 may utilize an operating system such as iOS®, ANDROID®, MS-DOS®, MS-WINDOWS®, OS/2®, UNIX®, LINUX®, or another known operating system. In some other cases, the I/O controller 1110 may represent or interact with a modem, a keyboard, a mouse, a touchscreen, or a similar device. In some cases, the I/O controller 1110 may be implemented as part of a processor, such as the processor 1140. In some cases, a user may interact with the device 1105 via the I/O controller 1110 or via hardware components controlled by the I/O controller 1110.

In some cases, the device 1105 may include a single antenna 1125. However, in some other cases the device 1105 may have more than one antenna 1125, which may be capable of concurrently transmitting or receiving multiple wireless transmissions. The transceiver 1115 may communicate bi-directionally, via the one or more antennas 1125, wired, or wireless links as described herein. For example, the transceiver 1115 may represent a wireless transceiver and may communicate bi-directionally with another wireless transceiver. The transceiver 1115 may also include a modem to modulate the packets and provide the modulated packets to one or more antennas 1125 for transmission, and to demodulate packets received from the one or more antennas 1125. The transceiver 1115, or the transceiver 1115 and one or more antennas 1125, may be an example of a transmitter 815, a transmitter 915, a receiver 810, a receiver 910, or any combination thereof or component thereof, as described herein.

The memory 1130 may include random access memory (RAM) and read-only memory (ROM). The memory 1130 may store computer-readable, computer-executable code 1135 including instructions that, when executed by the processor 1140, cause the device 1105 to perform various functions described herein. The code 1135 may be stored in a non-transitory computer-readable medium such as system memory or other type of memory. In some cases, the code 1135 may not be directly executable by the processor 1140 but may cause a computer (for example, when compiled and executed) to perform functions described herein. In some cases, the memory 1130 may contain, among other things, a basic I/O system (BIOS) which may control basic hardware or software operation such as the interaction with peripheral components or devices.

The processor 1140 may include an intelligent hardware device (for example, a general-purpose processor, a DSP, a CPU, a microcontroller, an ASIC, an FPGA, a programmable logic device, a discrete gate or transistor logic component, a discrete hardware component, or any combination thereof). In some cases, the processor 1140 may be configured to operate a memory array using a memory controller. In some other cases, a memory controller may be integrated into the processor 1140. The processor 1140 may be configured to execute computer-readable instructions stored in a memory (for example, the memory 1130) to cause the device 1105 to perform various functions (for example, functions or tasks supporting beam management with backtracking and dithering). For example, the device 1105 or a component of the device 1105 may include a processor 1140 and memory 1130 coupled to the processor 1140, the processor 1140 and memory 1130 configured to perform various functions described herein.

The communications manager 1120 may support wireless communications at a first wireless device in accordance with examples as disclosed herein. For example, the communications manager 1120 may be configured as or otherwise support a means for receiving, from a second wireless device, one or more signals on each beam of a set of multiple first layer beams. The communications manager 1120 may be configured as or otherwise support a means for measuring, as part of a beam selection procedure for communicating with the second wireless device, a first beam selection parameter for the one or more signals, the first beam selection parameter measured for each beam of the set of multiple first layer beams. The communications manager 1120 may be configured as or otherwise support a means for selecting a first beam of the set of multiple the first layer beams based on the measuring. The communications manager 1120 may be configured as or otherwise support a means for measuring a second beam selection parameter for each beam of a set of multiple second layer beams associated with the first beam based on selecting the first beam. The communications manager 1120 may be configured as or otherwise support a means for selecting a second beam of the set of multiple first layer beams based on measuring the first beam selection parameter and measuring the second beam selection parameter.

By including or configuring the communications manager 1120 in accordance with examples as described herein, the device 1105 may support techniques for improved communications and improved user experience. For example, based on the backtracking and dithering techniques, a processor of the device 1105 may determine an optimal beam for communications with an additional wireless device.

In some examples, the communications manager 1120 may be configured to perform various operations (for example, receiving, monitoring, transmitting) using or otherwise in cooperation with the transceiver 1115, the one or more antennas 1125, or any combination thereof. Although the communications manager 1120 is illustrated as a separate component, in some examples, one or more functions described with reference to the communications manager 1120 may be supported by or performed by the processor 1140, the memory 1130, the code 1135, or any combination thereof. For example, the code 1135 may include instructions executable by the processor 1140 to cause the device 1105 to perform various aspects of beam management with backtracking and dithering as described herein, or the processor 1140 and the memory 1130 may be otherwise configured to perform or support such operations.

In some implementations, the device 1105 may include a multipath beam component to perform an optimized beam search for multipath scenarios (that is, no LOS path) using machine learning for on the fly updates during online operation and using simulation and characterization (for example but not limited to, cases where a phantom hand is holding the device in different ways). For example, the multipath beam component may use the communications manager 1120 and the processor 1140 to identify beams for use in multipath scenarios on the fly (for example, using the machine learning) and via offline procedures (for example, using the characterization and simulations) and may store the optimal multipath beams within the device 1105 (for example, in the memory 1130).

Figure 12:
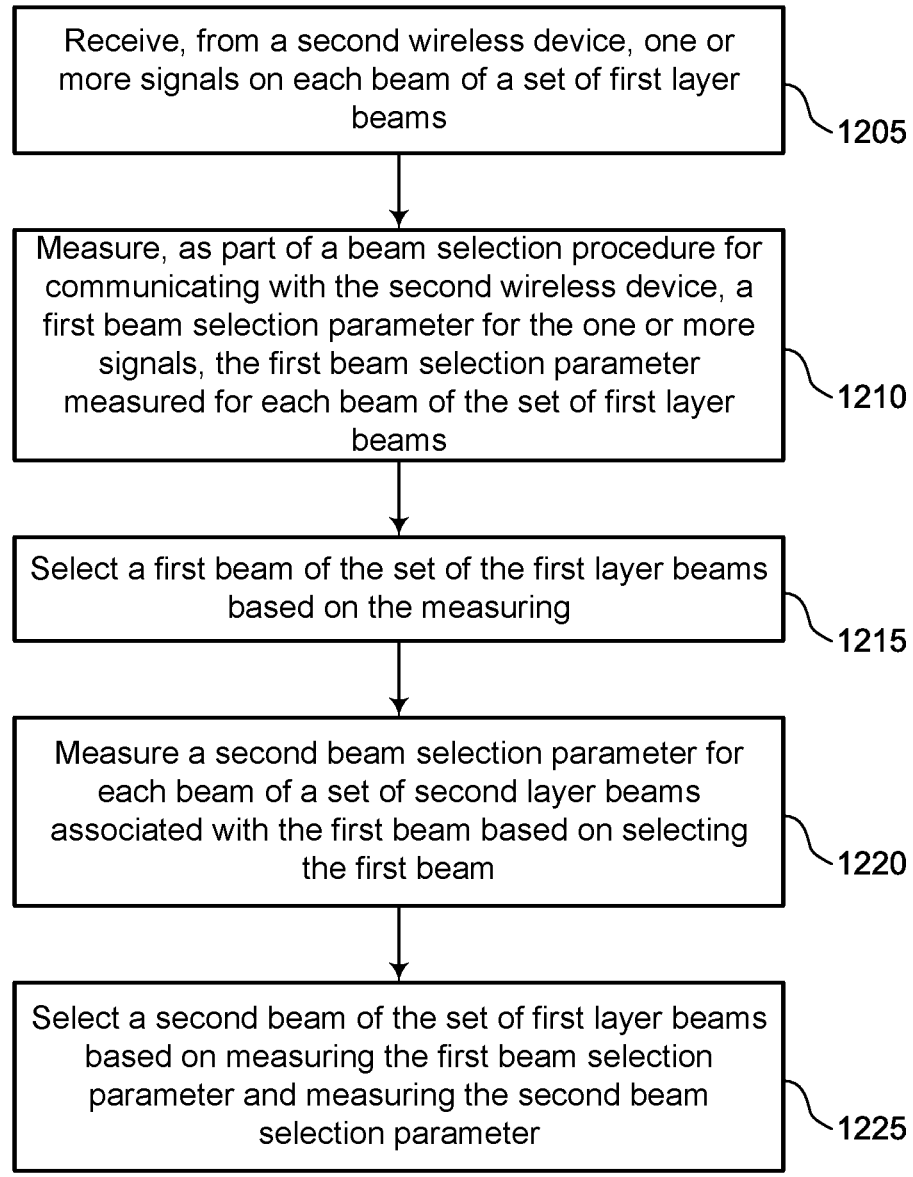
FIGS. 12-16 show flowcharts illustrating methods that support beam management with backtracking and dithering in accordance with aspects of the present disclosure.

FIG. 12 shows a flowchart illustrating a method that supports beam management with backtracking and dithering in accordance with aspects of the present disclosure. The operations of the method may be implemented by a UE or a base station or its components as described herein (for example, a first wireless device). For example, the operations of the method may be performed by a UE 115 or a base station 105 as described with reference to FIGS. 1-11. In some examples, a UE or a base station may execute a set of instructions to control the functional elements of the UE or the base station to perform the described functions. Additionally or alternatively, the UE or the base station may perform aspects of the described functions using special-purpose hardware.

At 1205, the method may include receiving, from a second wireless device, one or more signals on each beam of a set of multiple first layer beams. The operations of 1205 may be performed in accordance with examples as disclosed herein. In some examples, aspects of the operations of 1205 may be performed by a signal component 1025 as described with reference to FIG. 10.

At 1210, the method may include measuring, as part of a beam selection procedure for communicating with the second wireless device, a first beam selection parameter for the one or more signals, the first beam selection parameter measured for each beam of the set of multiple first layer beams. The operations of 1210 may be performed in accordance with examples as disclosed herein. In some examples, aspects of the operations of 1210 may be performed by a first layer beam selection parameter component 1030 as described with reference to FIG. 10.

At 1215, the method may include selecting a first beam of the set of multiple the first layer beams based on the measuring. The operations of 1215 may be performed in accordance with examples as disclosed herein. In some examples, aspects of the operations of 1215 may be performed by a first layer beam selection component 1035 as described with reference to FIG. 10.

At 1220, the method may include measuring a second beam selection parameter for each beam of a set of multiple second layer beams associated with the first beam based on selecting the first beam. The operations of 1220 may be performed in accordance with examples as disclosed herein. In some examples, aspects of the operations of 1220 may be performed by a second layer beam selection parameter component 1040 as described with reference to FIG. 10.

At 1225, the method may include selecting a second beam of the set of multiple first layer beams based on measuring the first beam selection parameter and measuring the second beam selection parameter. The operations of 1225 may be performed in accordance with examples as disclosed herein. In some examples, aspects of the operations of 1225 may be performed by a backtracking component 1045 as described with reference to FIG. 10.

Figure 13:
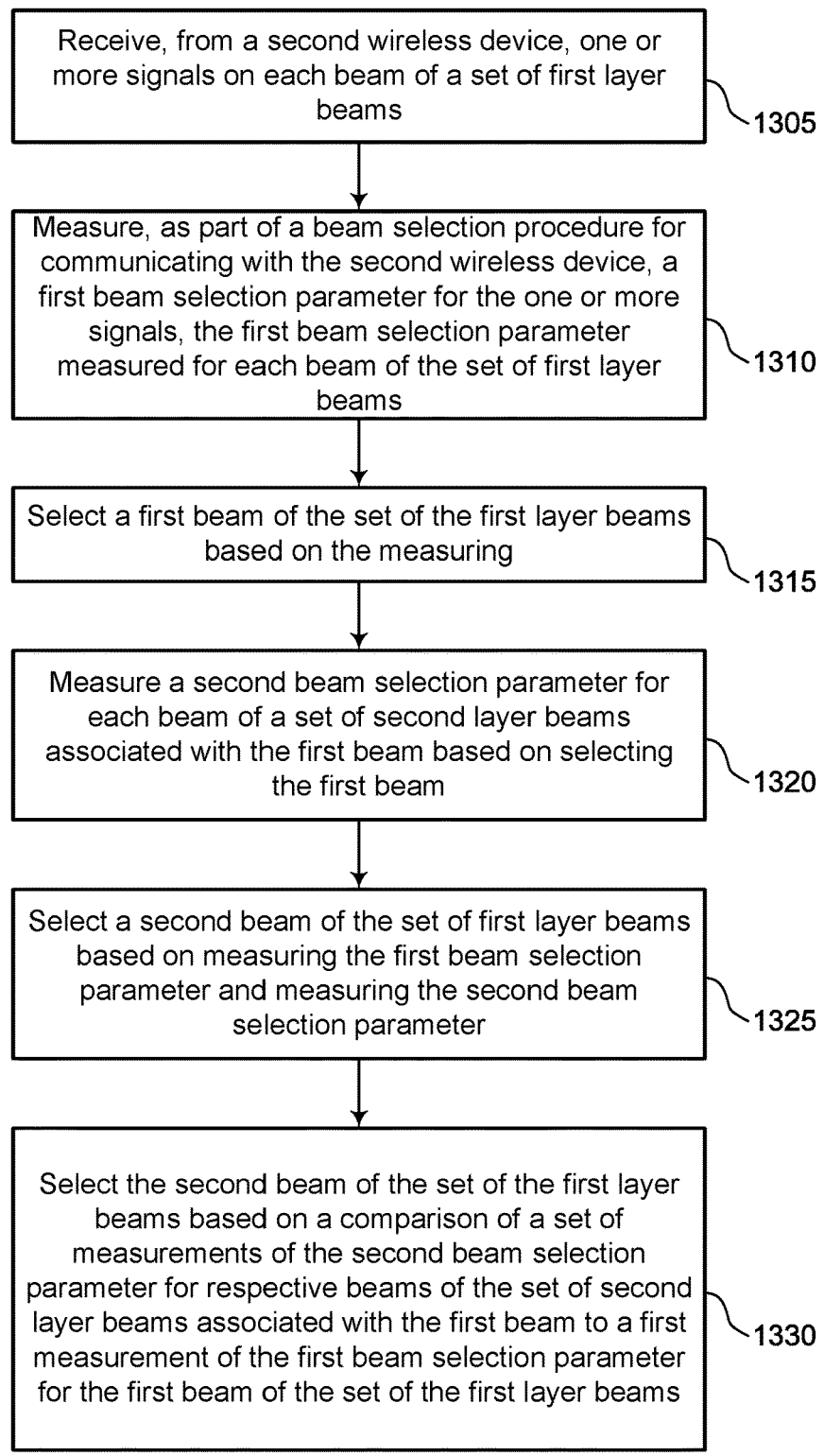

FIG. 13 shows a flowchart illustrating a method that supports beam management with backtracking and dithering in accordance with aspects of the present disclosure. The operations of the method may be implemented by a UE or a base station or its components as described herein (for example, a first wireless device). For example, the operations of the method may be performed by a UE 115 or a base station 105 as described with reference to FIGS. 1-11. In some examples, a UE or a base station may execute a set of instructions to control the functional elements of the UE or the base station to perform the described functions. Additionally or alternatively, the UE or a base station may perform aspects of the described functions using special-purpose hardware.

At 1305, the method may include receiving, from a second wireless device, one or more signals on each beam of a set of multiple first layer beams. The operations of 1305 may be performed in accordance with examples as disclosed herein. In some examples, aspects of the operations of 1305 may be performed by a signal component 1025 as described with reference to FIG. 10.

At 1310, the method may include measuring, as part of a beam selection procedure for communicating with the second wireless device, a first beam selection parameter for the one or more signals, the first beam selection parameter measured for each beam of the set of multiple first layer beams. The operations of 1310 may be performed in accordance with examples as disclosed herein. In some examples, aspects of the operations of 1310 may be performed by a first layer beam selection parameter component 1030 as described with reference to FIG. 10.

At 1315, the method may include selecting a first beam of the set of multiple the first layer beams based on the measuring. The operations of 1315 may be performed in accordance with examples as disclosed herein. In some examples, aspects of the operations of 1315 may be performed by a first layer beam selection component 1035 as described with reference to FIG. 10.

At 1320, the method may include measuring a second beam selection parameter for each beam of a set of multiple second layer beams associated with the first beam based on selecting the first beam. The operations of 1320 may be performed in accordance with examples as disclosed herein. In some examples, aspects of the operations of 1320 may be performed by a second layer beam selection parameter component 1040 as described with reference to FIG. 10.

At 1325, the method may include selecting a second beam of the set of multiple first layer beams based on measuring the first beam selection parameter and measuring the second beam selection parameter. The operations of 1325 may be performed in accordance with examples as disclosed herein.

In some examples, aspects of the operations of 1325 may be performed by a backtracking component 1045 as described with reference to FIG. 10.

At 1330, the method may include selecting the second beam of the set of multiple the first layer beams based on a comparison of a set of multiple measurements of the second beam selection parameter for respective beams of the set of multiple second layer beams associated with the first beam to a first measurement of the first beam selection parameter for the first beam of the set of multiple the first layer beams. The operations of 1330 may be performed in accordance with examples as disclosed herein. In some examples, aspects of the operations of 1330 may be performed by a backtracking component 1045 as described with reference to FIG. 10.

Figure 14:
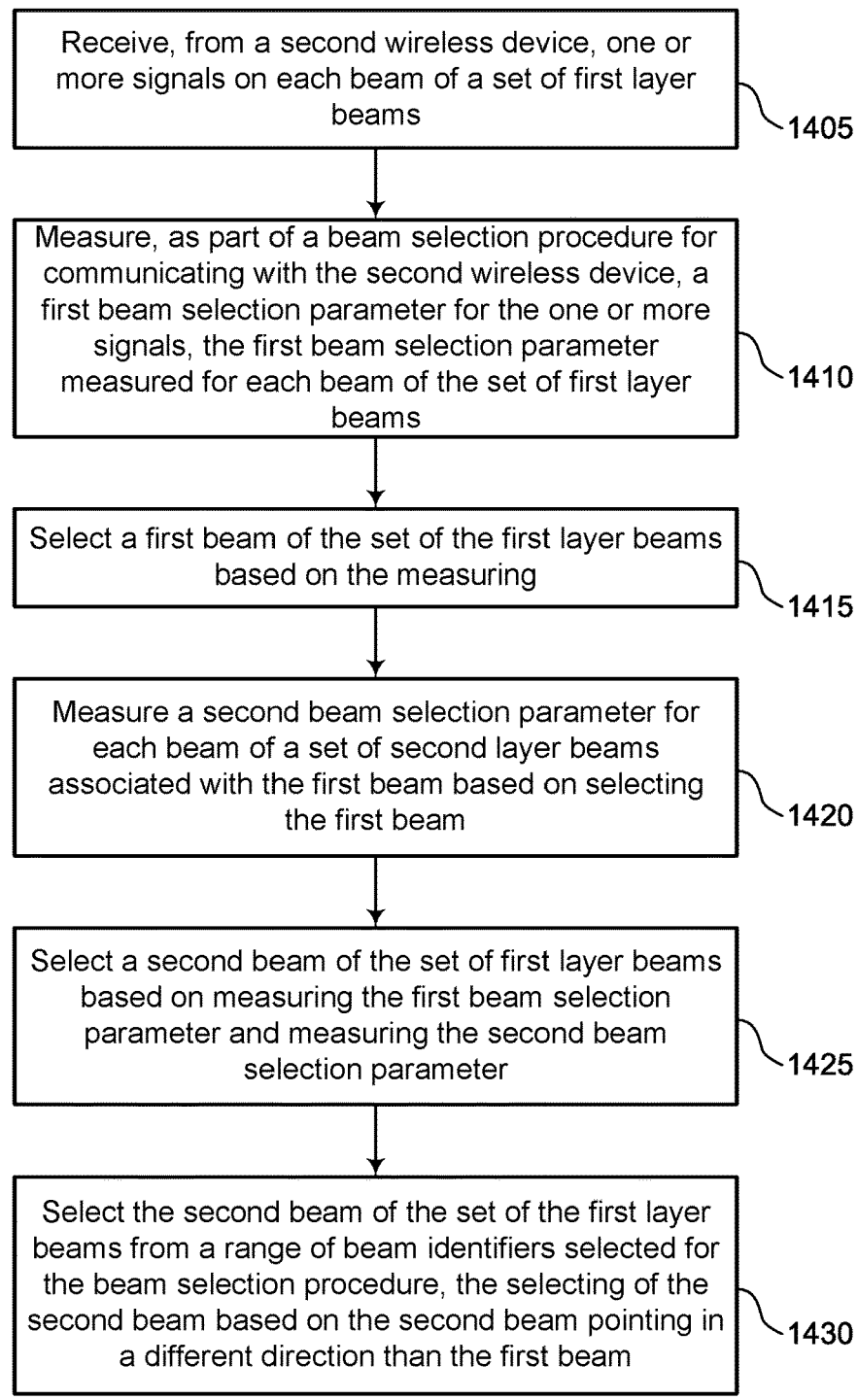

FIG. 14 shows a flowchart illustrating a method that supports beam management with backtracking and dithering in accordance with aspects of the present disclosure. The operations of the method may be implemented by a UE or a base station or its components as described herein (for example, a first wireless device). For example, the operations of the method may be performed by a UE 115 or a base station 105 as described with reference to FIGS. 1-11. In some examples, a UE or a base station may execute a set of instructions to control the functional elements of the UE or the base station to perform the described functions. Additionally or alternatively, the UE or the base station may perform aspects of the described functions using special-purpose hardware.

At 1405, the method may include receiving, from a second wireless device, one or more signals on each beam of a set of multiple first layer beams. The operations of 1405 may be performed in accordance with examples as disclosed herein. In some examples, aspects of the operations of 1405 may be performed by a signal component 1025 as described with reference to FIG. 10.

At 1410, the method may include measuring, as part of a beam selection procedure for communicating with the second wireless device, a first beam selection parameter for the one or more signals, the first beam selection parameter measured for each beam of the set of multiple first layer beams. The operations of 1410 may be performed in accordance with examples as disclosed herein. In some examples, aspects of the operations of 1410 may be performed by a first layer beam selection parameter component 1030 as described with reference to FIG. 10.

At 1415, the method may include selecting a first beam of the set of multiple the first layer beams based on the measuring. The operations of 1415 may be performed in accordance with examples as disclosed herein. In some examples, aspects of the operations of 1415 may be performed by a first layer beam selection component 1035 as described with reference to FIG. 10.

At 1420, the method may include measuring a second beam selection parameter for each beam of a set of multiple second layer beams associated with the first beam based on selecting the first beam. The operations of 1420 may be performed in accordance with examples as disclosed herein. In some examples, aspects of the operations of 1420 may be performed by a second layer beam selection parameter component 1040 as described with reference to FIG. 10.

At 1425, the method may include selecting a second beam of the set of multiple first layer beams based on measuring the first beam selection parameter and measuring the second beam selection parameter. The operations of 1425 may be performed in accordance with examples as disclosed herein.

In some examples, aspects of the operations of 1425 may be performed by a backtracking component 1045 as described with reference to FIG. 10.

At 1430, the method may include selecting the second beam of the set of multiple the first layer beams from a range of beam identifiers selected for the beam selection procedure, the selecting of the second beam based on the second beam pointing in a different direction than the first beam. The operations of 1430 may be performed in accordance with examples as disclosed herein. In some examples, aspects of the operations of 1430 may be performed by a dithering component 1050 as described with reference to FIG. 10.

Figure 15:
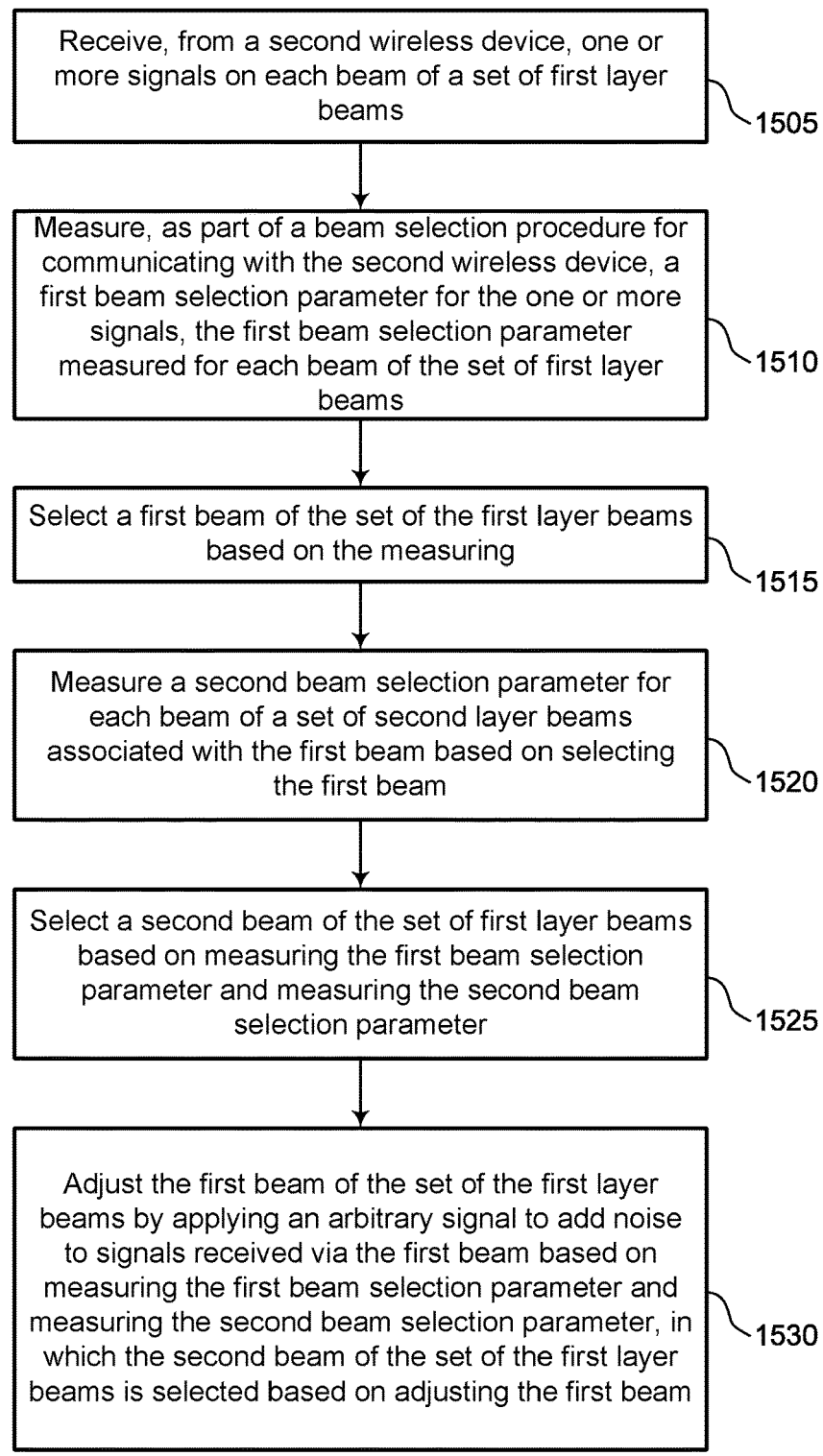

FIG. 15 shows a flowchart illustrating a method that supports beam management with backtracking and dithering in accordance with aspects of the present disclosure. The operations of the method may be implemented by a UE or a base station or its components as described herein (for example, a first wireless device). For example, the operations of the method may be performed by a UE 115 or a base station 105 as described with reference to FIGS. 1-11. In some examples, a UE or a base station may execute a set of instructions to control the functional elements of the UE or the base station to perform the described functions. Additionally or alternatively, the UE or the base station may perform aspects of the described functions using special-purpose hardware.

At 1505, the method may include receiving, from a second wireless device, one or more signals on each beam of a set of multiple first layer beams. The operations of 1505 may be performed in accordance with examples as disclosed herein. In some examples, aspects of the operations of 1505 may be performed by a signal component 1025 as described with reference to FIG. 10.

At 1510, the method may include measuring, as part of a beam selection procedure for communicating with the second wireless device, a first beam selection parameter for the one or more signals, the first beam selection parameter measured for each beam of the set of multiple first layer beams. The operations of 1510 may be performed in accordance with examples as disclosed herein. In some examples, aspects of the operations of 1510 may be performed by a first layer beam selection parameter component 1030 as described with reference to FIG. 10.

At 1515, the method may include selecting a first beam of the set of multiple the first layer beams based on the measuring. The operations of 1515 may be performed in accordance with examples as disclosed herein. In some examples, aspects of the operations of 1515 may be performed by a first layer beam selection component 1035 as described with reference to FIG. 10.

At 1520, the method may include measuring a second beam selection parameter for each beam of a set of multiple second layer beams associated with the first beam based on selecting the first beam. The operations of 1520 may be performed in accordance with examples as disclosed herein. In some examples, aspects of the operations of 1520 may be performed by a second layer beam selection parameter component 1040 as described with reference to FIG. 10.

At 1525, the method may include selecting a second beam of the set of multiple first layer beams based on measuring the first beam selection parameter and measuring the second beam selection parameter. The operations of 1525 may be performed in accordance with examples as disclosed herein. In some examples, aspects of the operations of 1525 may be performed by a backtracking component 1045 as described with reference to FIG. 10.

At 1530, the method may include adjusting the first beam of the set of multiple the first layer beams by applying an arbitrary signal to add noise to signals received via the first beam based on measuring the first beam selection parameter and measuring the second beam selection parameter, in which the second beam of the set of multiple the first layer beams is selected based on adjusting the first beam. The operations of 1530 may be performed in accordance with examples as disclosed herein. In some examples, aspects of the operations of 1530 may be performed by a dithering component 1050 as described with reference to FIG. 10.

Figure 16:
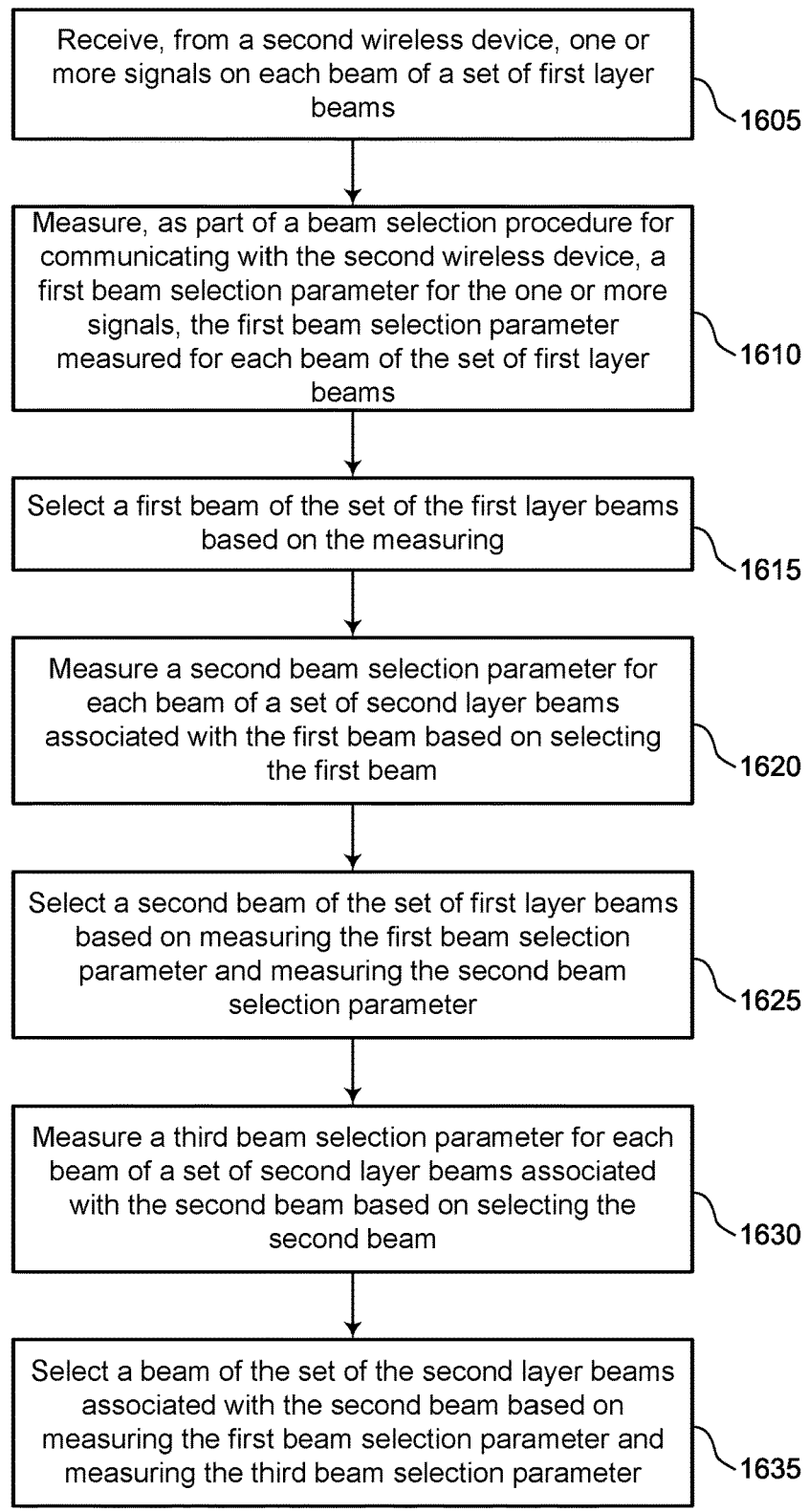

FIG. 16 shows a flowchart illustrating a method that supports beam management with backtracking and dithering in accordance with aspects of the present disclosure. The operations of the method may be implemented by a UE or a base station or its components as described herein (for example, a first wireless device). For example, the operations of the method may be performed by a UE 115 or a base station 105 as described with reference to FIGS. 1-11. In some examples, a UE or a base station may execute a set of instructions to control the functional elements of the UE or the base station to perform the described functions. Additionally or alternatively, the UE or the base station may perform aspects of the described functions using special-purpose hardware.

At 1605, the method may include receiving, from a second wireless device, one or more signals on each beam of a set of multiple first layer beams. The operations of 1605 may be performed in accordance with examples as disclosed herein. In some examples, aspects of the operations of 1605 may be performed by a signal component 1025 as described with reference to FIG. 10.

At 1610, the method may include measuring, as part of a beam selection procedure for communicating with the second wireless device, a first beam selection parameter for the one or more signals, the first beam selection parameter measured for each beam of the set of multiple first layer beams. The operations of 1610 may be performed in accordance with examples as disclosed herein. In some examples, aspects of the operations of 1610 may be performed by a first layer beam selection parameter component 1030 as described with reference to FIG. 10.

At 1615, the method may include selecting a first beam of the set of multiple the first layer beams based on the measuring. The operations of 1615 may be performed in accordance with examples as disclosed herein. In some examples, aspects of the operations of 1615 may be performed by a first layer beam selection component 1035 as described with reference to FIG. 10.

At 1620, the method may include measuring a second beam selection parameter for each beam of a set of multiple second layer beams associated with the first beam based on selecting the first beam. The operations of 1620 may be performed in accordance with examples as disclosed herein. In some examples, aspects of the operations of 1620 may be performed by a second layer beam selection parameter component 1040 as described with reference to FIG. 10.

At 1625, the method may include selecting a second beam of the set of multiple first layer beams based on measuring the first beam selection parameter and measuring the second beam selection parameter. The operations of 1625 may be performed in accordance with examples as disclosed herein. In some examples, aspects of the operations of 1625 may be performed by a backtracking component 1045 as described with reference to FIG. 10.

At 1630, the method may include measuring a third beam selection parameter for each beam of a set of multiple second layer beams associated with the second beam based on selecting the second beam. The operations of 1630 may be performed in accordance with examples as disclosed herein. In some examples, aspects of the operations of 1630 may be performed by a beam selection procedure continuation component 1060 as described with reference to FIG. 10.

At 1635, the method may include selecting a beam of the set of multiple the second layer beams associated with the second beam based on measuring the first beam selection parameter and measuring the third beam selection parameter. The operations of 1635 may be performed in accordance with examples as disclosed herein. In some examples, aspects of the operations of 1635 may be performed by a beam selection procedure continuation component 1060 as described with reference to FIG. 10.

The following provides an overview of aspects of the present disclosure:

Aspect 1: A method for wireless communications at a first wireless device, comprising: receiving, from a second wireless device, one or more signals on each beam of a plurality of first layer beams; measuring, as part of a beam selection procedure for communicating with the second wireless device, a first beam selection parameter for the one or more signals, the first beam selection parameter measured for each beam of the plurality of first layer beams; selecting a first beam of the plurality of the first layer beams based at least in part on the measuring; measuring a second beam selection parameter for each beam of a plurality of second layer beams associated with the first beam based at least in part on selecting the first beam; and selecting a second beam of the plurality of first layer beams based at least in part on measuring the first beam selection parameter and measuring the second beam selection parameter.

Aspect 2: The method of aspect 1, wherein selecting the second beam of the plurality of first layer beams comprises: selecting the second beam of the plurality of the first layer beams based at least in part on a comparison of a plurality of measurements of the second beam selection parameter for respective beams of the plurality of second layer beams associated with the first beam to a first measurement of the first beam selection parameter for the first beam of the plurality of the first layer beams.

Aspect 3: The method of aspect 2, wherein the selecting the second beam of the plurality of the first layer beams is based at least in part on the plurality of measurements of the second beam selection parameter for each beam of the plurality of second layer beams being less than the first measurement of the first beam selection parameter for the first beam.

Aspect 4: The method of any of aspects 1 through 3, wherein selecting the second beam of the plurality of first layer beams comprises: selecting the second beam of the plurality of the first layer beams from a range of beam identifiers selected for the beam selection procedure, the selecting of the second beam based at least in part on the second beam pointing in a different direction than the first beam.

Aspect 5: The method of any of aspects 1 through 4, further comprising: adjusting the first beam of the plurality of the first layer beams by applying an arbitrary signal to add noise to signals received via the first beam based at least in part on measuring the first beam selection parameter and measuring the second beam selection parameter, wherein the second beam of the plurality of the first layer beams is selected based at least in part on adjusting the first beam.

Aspect 6: The method of aspect 5, wherein the adjusting of the first beam of the plurality of the first layer beams comprises a change of a beam pattern for the first beam.

Aspect 7: The method of any of aspects 1 through 6, further comprising: determining an operability condition for one or more technology operations of the first wireless device based at least in part on measurements of how the one or more technology operations are affected by beamforming communications in a same time slot, wherein selecting the first beam of the plurality of the first layer beams, the second beam of the plurality of the first layer beams, or both is based at least in part on determining the operability condition.

Aspect 8: The method of aspect 7, wherein the one or more technology operations comprise one or more of operations using a different radio access technology than a radio access technology used for the communicating with the second wireless device, operations using a global positioning system, or operations using wireless fidelity protocols.

Aspect 9: The method of any of aspects 1 through 8, further comprising: determining a battery charge level of the first wireless device, wherein selecting the first beam of the plurality of the first layer beams, the second beam of the plurality of the first layer beams, or both is based at least in part on the battery charge level of the first wireless device.

Aspect 10: The method of any of aspects 1 through 9, further comprising: determining a latency and link reliability condition for the communicating with the second wireless device, wherein selecting the first beam of the plurality of the first layer beams, the second beam of the plurality of the first layer beams, or both is based at least in part on determining the latency and link reliability condition for the communicating with the second wireless device.

Aspect 11: The method of any of aspects 1 through 10, further comprising: measuring a third beam selection parameter for each beam of a plurality of second layer beams associated with the second beam based at least in part on selecting the second beam; and selecting a beam of the plurality of the second layer beams associated with the second beam based at least in part on measuring the first beam selection parameter and measuring the third beam selection parameter.

Aspect 12: The method of aspect 11, further comprising: selecting the beam of the plurality of the second layer beams associated with the second beam based at least in part on a first comparison of a first measurement of the first beam selection parameter for the second beam of the plurality of first layer beams to a plurality of measurements of the third beam selection parameter for respective beams of the plurality of second layer beams associated with the second beam and based at least in part on a second comparison of respective measurements of the plurality of measurements of the third beam selection parameter for each beam of the plurality of the second layer beams associated with the second beam.

Aspect 13: The method of aspect 12, wherein the selecting the beam of the plurality of the second layer beams is based at least in part on a measurement of the third beam selection parameter for the beam of the plurality of the second layer beams associated with the second beam being higher than the first measurement of the first beam selection parameter for the second beam and based at least in part on the measurement of the third beam selection parameter for the beam being a highest value for the plurality of the second layer beams associated with the second beam.

Aspect 14: The method of any of aspects 1 through 13, further comprising: determining that selection of the first beam of the plurality of the first layer beams for the beam selection procedure results in one or more subsequent beams not suitable for the communicating with the second wireless device based at least in part on a plurality of measurements of the second beam selection parameter for respective beams of the plurality of the second layer beams associated with the first beam being less than a first measurement of the first beam selection parameter for the first beam.

Aspect 15: The method of any of aspects 1 through 14, further comprising: determining the plurality of the first layer beams for performing the beam selection procedure, wherein the measuring the first beam selection parameter is based at least in part on determining the plurality of the first layer beams for performing the beam selection procedure.

Aspect 16: The method of any of aspects 1 through 15, wherein the plurality of the first layer beams comprises a plurality of layer one beams, and the plurality of the second layer beams comprises a plurality of layer two beams corresponding to a layer one beam of the plurality of layer one beams.

Aspect 17: The method of any of aspects 1 through 16, wherein the plurality of the first layer beams, the plurality of the second layer beams, or both comprise line-of-sight beams.

Aspect 18: The method of any of aspects 1 through 17, wherein the plurality of the first layer beams, the plurality of the second layer beams, or both comprise multipath beams, the method further comprising: determining the plurality of the first layer beams, the plurality of the second layer beams, or both based at least in part on the plurality of the first layer beams, the plurality of the second layer beams, or both comprising multipath beams, wherein the measuring the first beam selection parameter and the measuring the second beam selection parameter are based at least in part on determining the plurality of the first layer beams, the plurality of the second layer beams, or both for performing the beam selection procedure.

Aspect 19: The method of aspect 18, further comprising: determining the plurality of the first layer beams, the plurality of the second layer beams, or both comprise the multipath beams based at least in part on sensing multiple directional beams with signal measurements that fall within a range of each other for the multiple directional beams.

Aspect 20: The method of aspect 19, wherein the plurality of the first layer beams, the plurality of the second layer beams, or both are determined based at least in part on one or more of a machine learning procedure or a beam characterization procedure for different multipath conditions or simulated channel models.

Aspect 21: The method of any of aspects 1 through 20, wherein the first beam selection parameter, the second beam selection parameter, or both comprise a received signal power measurement.

Aspect 22: An apparatus for wireless communications at a first wireless device, comprising a processor; memory coupled with the processor; and instructions stored in the memory and executable by the processor to cause the apparatus to perform a method of any of aspects 1 through 21.

Aspect 23: An apparatus for wireless communications at a first wireless device, comprising at least one means for performing a method of any of aspects 1 through 21.

Aspect 24: A non-transitory computer-readable medium storing code for wireless communications at a first wireless device, the code comprising instructions executable by a processor to perform a method of any of aspects 1 through 21.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (for example, a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc in which disks usually reproduce data magnetically, while discs reproduce data optically with lasers. Combinations of the above are also included within the scope of computer-readable media.

As used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (that is, A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method for wireless communications at a first wireless device, comprising:
receiving, from a second wireless device, one or more signals on each beam of a plurality of first layer beams;

measuring, as part of a beam selection procedure for communicating with the second wireless device, a first beam selection parameter for the one or more signals, the first beam selection parameter measured for each beam of the plurality of first layer beams;

selecting a first beam of the plurality of the first layer beams based at least in part on the measuring;

measuring a second beam selection parameter for each beam of a plurality of second layer beams associated with the first beam based at least in part on selecting the first beam;

selecting a second beam of the plurality of first layer beams based at least in part on measuring the second beam selection parameter;

measuring a third beam selection parameter for each beam of a plurality of second layer beams associated with the second beam based at least in part on selecting the second beam; and selecting a beam of the plurality of the second layer beams associated with the second beam based at least in part on measuring the first beam selection parameter and measuring the third beam selection parameter.

2. The method of claim 1, wherein selecting the second beam of the plurality of first layer beams comprises selecting the second beam of the plurality of the first layer beams based at least in part on a comparison of a plurality of measurements of the second beam selection parameter for respective beams of the plurality of second layer beams associated with the first beam to a first measurement of the first beam selection parameter for the first beam of the plurality of the first layer beams.

3. The method of claim 2, wherein the selecting the second beam of the plurality of the first layer beams is based at least in part on the plurality of measurements of the second beam selection parameter for each beam of the plurality of second layer beams being less than the first measurement of the first beam selection parameter for the first beam.

4. The method of claim 1, wherein selecting the second beam of the plurality of first layer beams comprises selecting the second beam of the plurality of the first layer beams from a range of beam identifiers selected for the beam selection procedure, the selecting of the second beam based at least in part on the second beam pointing in a different direction than the first beam.

5. The method of claim 1, further comprising adjusting the first beam of the plurality of the first layer beams by applying an arbitrary signal to add noise to signals received via the first beam based at least in part on measuring the first beam selection parameter and measuring the second beam selection parameter, wherein the second beam of the plurality of the first layer beams is selected based at least in part on adjusting the first beam.

6. The method of claim 5, wherein the adjusting of the first beam of the plurality of the first layer beams comprises a change of a beam pattern for the first beam.

7. The method of claim 1, further comprising determining an operability condition for one or more technology operations of the first wireless device based at least in part on measurements of how the one or more technology operations are affected by beamforming communications in a same time slot, wherein selecting the first beam of the plurality of the first layer beams, the second beam of the plurality of the first layer beams, or both is based at least in part on determining the operability condition.

8. The method of claim 7, wherein the one or more technology operations comprise one or more of operations using a different radio access technology than a radio access technology used for the communicating with the second wireless device, operations using a global positioning system, or operations using wireless fidelity protocols.

9. The method of claim 1, further comprising determining a battery charge level of the first wireless device, wherein selecting the first beam of the plurality of the first layer beams, the second beam of the plurality of the first layer beams, or both is based at least in part on the battery charge level of the first wireless device.

10. The method of claim 1, further comprising determining a latency and link reliability condition for the communicating with the second wireless device, wherein selecting the first beam of the plurality of the first layer beams, the second beam of the plurality of the first layer beams, or both is based at least in part on determining the latency and link reliability condition for the communicating with the second wireless device.

11. The method of claim 1, further comprising selecting the beam of the plurality of the second layer beams associated with the second beam based at least in part on a first comparison of a first measurement of the first beam selection parameter for the second beam of the plurality of first layer beams to a plurality of measurements of the third beam selection parameter for respective beams of the plurality of second layer beams associated with the second beam and based at least in part on a second comparison of respective measurements of the plurality of measurements of the third beam selection parameter for each beam of the plurality of the second layer beams associated with the second beam.

12. The method of claim 11, wherein the selecting the beam of the plurality of the second layer beams is based at least in part on a measurement of the third beam selection parameter for the beam of the plurality of the second layer beams associated with the second beam being higher than the first measurement of the first beam selection parameter for the second beam and based at least in part on the measurement of the third beam selection parameter for the beam being a highest value for the plurality of the second layer beams associated with the second beam.

13. The method of claim 1, further comprising determining that selection of the first beam of the plurality of the first layer beams for the beam selection procedure results in one or more subsequent beams not suitable for the communicating with the second wireless device based at least in part on a plurality of measurements of the second beam selection parameter for respective beams of the plurality of the second layer beams associated with the first beam being less than a first measurement of the first beam selection parameter for the first beam.

14. The method of claim 1, further comprising determining the plurality of the first layer beams for performing the beam selection procedure, wherein the measuring the first beam selection parameter is based at least in part on determining the plurality of the first layer beams for performing the beam selection procedure.

15. The method of claim 1, wherein the plurality of the first layer beams comprises a plurality of layer one beams, and the plurality of the second layer beams comprises a plurality of layer two beams corresponding to a layer one beam of the plurality of layer one beams.

16. The method of claim 1, wherein the plurality of the first layer beams, the plurality of the second layer beams, or both comprise line-of-sight beams.

17. The method of claim 1, wherein the plurality of the first layer beams, the plurality of the second layer beams, or both comprise multipath beams, the method further comprising determining the plurality of the first layer beams, the plurality of the second layer beams, or both based at least in part on the plurality of the first layer beams, the plurality of the second layer beams, or both comprising multipath beams, wherein the measuring the first beam selection parameter and the measuring the second beam selection parameter are based at least in part on determining the plurality of the first layer beams, the plurality of the second layer beams, or both for performing the beam selection procedure.

18. The method of claim 17, further comprising determining the plurality of the first layer beams, the plurality of the second layer beams, or both comprise the multipath beams based at least in part on sensing multiple directional beams with signal measurements that fall within a range of each other for the multiple directional beams.

19. The method of claim 18, wherein the plurality of the first layer beams, the plurality of the second layer beams, or both are determined based at least in part on one or more of a machine learning procedure or a beam characterization procedure for different multipath conditions or simulated channel models.

20. The method of claim 1, wherein the first beam selection parameter, the second beam selection parameter, or both comprise a received signal power measurement.

21. An apparatus for wireless communications at a first wireless device, comprising:
a processor;
memory coupled with the processor; and
instructions stored in the memory and executable by the processor to cause the apparatus to:
receive, from a second wireless device, one or more signals on each beam of a plurality of first layer beams;
measure, as part of a beam selection procedure for communicating with the second wireless device, a first beam selection parameter for the one or more signals, the first beam selection parameter measured for each beam of the plurality of first layer beams;
select a first beam of the plurality of the first layer beams based at least in part on the measuring;
measure a second beam selection parameter for each beam of a plurality of second layer beams associated with the first beam based at least in part on selecting the first beam;
select a second beam of the plurality of first layer beams based at least in part on measuring the first beam selection parameter and measuring the second beam selection parameter;
measure a third beam selection parameter for each beam of a plurality of second layer beams associated with the second beam based at least in part on selecting the second beam; and
select a beam of the plurality of the second layer beams associated with the second beam based at least in part on measuring the first beam selection parameter and measuring the third beam selection parameter.

22. The apparatus of claim 21, wherein the instructions to select the second beam of the plurality of first layer beams are executable by the processor to cause the apparatus to select the second beam of the plurality of the first layer beams based at least in part on a comparison of a plurality of measurements of the second beam selection parameter for respective beams of the plurality of second layer beams associated with the first beam to a first measurement of the first beam selection parameter for the first beam of the plurality of the first layer beams.

23. The apparatus of claim 22, wherein the selecting the second beam of the plurality of the first layer beams is based at least in part on the plurality of measurements of the second beam selection parameter for each beam of the plurality of second layer beams being less than the first measurement of the first beam selection parameter for the first beam.

24. The apparatus of claim 21, wherein the instructions to select the second beam of the plurality of first layer beams are executable by the processor to cause the apparatus to select the second beam of the plurality of the first layer beams from a range of beam identifiers selected for the beam selection procedure, the selecting of the second beam based at least in part on the second beam pointing in a different direction than the first beam.

25. The apparatus of claim 21, wherein the instructions are further executable by the processor to cause the apparatus to adjust the first beam of the plurality of the first layer beams by applying an arbitrary signal to add noise to signals received via the first beam based at least in part on measuring the first beam selection parameter and measuring the second beam selection parameter, wherein the second beam of the plurality of the first layer beams is selected based at least in part on adjusting the first beam.

26. The apparatus of claim 25, wherein the adjusting of the first beam of the plurality of the first layer beams comprises a change of a beam pattern for the first beam.

27. The apparatus of claim 21, wherein the instructions are further executable by the processor to cause the apparatus to determine an operability condition for one or more technology operations of the first wireless device based at least in part on measurements of how the one or more technology operations are affected by beamforming communications in a same time slot, wherein selecting the first beam of the plurality of the first layer beams, the second beam of the plurality of the first layer beams, or both is based at least in part on determining the operability condition.

28. The apparatus of claim 27, wherein the one or more technology operations comprise one or more of operations using a different radio access technology than a radio access technology used for the communicating with the second wireless device, operations using a global positioning system, or operations using wireless fidelity protocols.

29. The apparatus of claim 21, wherein the instructions are further executable by the processor to cause the apparatus to determine a battery charge level of the first wireless device, wherein selecting the first beam of the plurality of the first layer beams, the second beam of the plurality of the first layer beams, or both is based at least in part on the battery charge level of the first wireless device.

30. The apparatus of claim 21, wherein the instructions are further executable by the processor to cause the apparatus to determine a latency and link reliability condition for the communicating with the second wireless device, wherein selecting the first beam of the plurality of the first layer beams, the second beam of the plurality of the first layer beams, or both is based at least in part on determining the latency and link reliability condition for the communicating with the second wireless device.

31. The apparatus of claim 22, wherein the instructions are further executable by the processor to cause the apparatus to select the beam of the plurality of the second layer beams associated with the second beam based at least in part on a first comparison of a first measurement of the first beam selection parameter for the second beam of the plurality of first layer beams to a plurality of measurements of the third beam selection parameter for respective beams of the plurality of second layer beams associated with the second beam and based at least in part on a second comparison of respective measurements of the plurality of measurements of the third beam selection parameter for each beam of the plurality of the second layer beams associated with the second beam.

32. The apparatus of claim 31, wherein the selecting the beam of the plurality of the second layer beams is based at least in part on a measurement of the third beam selection parameter for the beam of the plurality of the second layer beams associated with the second beam being higher than the first measurement of the first beam selection parameter for the second beam and based at least in part on the measurement of the third beam selection parameter for the beam being a highest value for the plurality of the second layer beams associated with the second beam.

33. The apparatus of claim 21, wherein the instructions are further executable by the processor to cause the apparatus to determine that selection of the first beam of the plurality of the first layer beams for the beam selection procedure results in one or more subsequent beams not suitable for the communicating with the second wireless device based at least in part on a plurality of measurements of the second beam selection parameter for respective beams of the plurality of the second layer beams associated with the first beam being less than a first measurement of the first beam selection parameter for the first beam.

34. The apparatus of claim 21, wherein the instructions are further executable by the processor to cause the apparatus to determine the plurality of the first layer beams for performing the beam selection procedure, wherein the measuring the first beam selection parameter is based at least in part on determining the plurality of the first layer beams for performing the beam selection procedure.

35. The apparatus of claim 21, wherein the plurality of the first layer beams comprises a plurality of layer one beams, and the plurality of the second layer beams comprises a plurality of layer two beams corresponding to a layer one beam of the plurality of layer one beams.

36. The apparatus of claim 21, wherein the plurality of the first layer beams, the plurality of the second layer beams, or both comprise line-of-sight beams.

37. The apparatus of claim 21, wherein the plurality of the first layer beams, the plurality of the second layer beams, or both comprise multipath beams, the instructions further executable by the processor to cause the apparatus to determine the plurality of the first layer beams, the plurality of the second layer beams, or both based at least in part on the plurality of the first layer beams, the plurality of the second layer beams, or both comprising multipath beams, wherein the measuring the first beam selection parameter and the measuring the second beam selection parameter are based at least in part on determining the plurality of the first layer beams, the plurality of the second layer beams, or both for performing the beam selection procedure.

38. The apparatus of claim 37, wherein the instructions are further executable by the processor to cause the apparatus to determine that the plurality of the first layer beams, the plurality of the second layer beams, or both comprise the multipath beams based at least in part on sensing multiple directional beams with signal measurements that fall within a range of each other for the multiple directional beams.

39. The apparatus of claim 38, wherein the plurality of the first layer beams, the plurality of the second layer beams, or both are determined based at least in part on one or more of a machine learning procedure or a beam characterization procedure for different multipath conditions or simulated channel models.

40. The apparatus of claim 21, wherein the first beam selection parameter, the second beam selection parameter, or both comprise a received signal power measurement.

41. A method for wireless communications at a first wireless device, comprising:
receiving, from a second wireless device, one or more signals on each beam of a plurality of first layer beams;
measuring, as part of a beam selection procedure for communicating with the second wireless device, a first beam selection parameter for the one or more signals, the first beam selection parameter measured for each beam of the plurality of first layer beams;
selecting a first beam of the plurality of the first layer beams based at least in part on the measuring;
measuring a second beam selection parameter for each beam of a plurality of second layer beams associated with the first beam based at least in part on selecting the first beam; and
selecting a second beam of the plurality of first layer beams as part of a backtrack procedure, a dithering procedure, or both based at least in part on measuring the first beam selection parameter and measuring the second beam selection parameter.

* * * * *